US006404917B1

(12) United States Patent
Kondo et al.

(10) Patent No.: US 6,404,917 B1
(45) Date of Patent: Jun. 11, 2002

(54) IMAGE COMPRESSOR

(75) Inventors: Tsuyoshi Kondo, Fukuoka; Kazunori Nakamura, Kasuga, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/306,787

(22) Filed: May 7, 1999

(30) Foreign Application Priority Data

May 14, 1998 (JP) ............................................ 10-131648

(51) Int. Cl.[7] .............................. G06K 9/00; G06K 9/36
(52) U.S. Cl. ........................ 382/166; 358/518; 345/589
(58) Field of Search .............................. 382/162, 164, 382/166, 167, 232, 233; 358/518, 520, 521, 523, 1.9; 345/589, 600, 601, 602, 604

(56) References Cited

U.S. PATENT DOCUMENTS 5,517,334 A  *  5/1996  Morag et al. ............... 358/518
5,798,767 A  *  8/1998  Poole et al. ................ 345/604
6,044,172 A  *  3/2000  Allen ......................... 382/166

* cited by examiner

Primary Examiner—Bhavesh Mehta
(74) Attorney, Agent, or Firm—Stevens, Davis, Miller & Mosher, LLP

(57) ABSTRACT

In an image compressor, a color space converting unit separates an image data into a luminance data and a chrominance data. An image block-dividing unit block-divides each of the luminance and chrominance data separated by the color space converting unit into a plurality of blocks each of which includes adjacent pixels. A luminance threshold value determining unit determines a threshold value for binarizing the luminance data. A luminance binarizing unit binarizes the luminance data using the determined threshold value. A typical value forming unit forms two typical values for each of the block-divided luminance and chrominance data in accordance with the luminance data. A binarized luminance compressing unit encodes the binarized luminance data using dictionaries whose number is smaller than the number of all combinations of the luminance data.

10 Claims, 32 Drawing Sheets

FIG. 6A

| 0 | 0 | 10 | 50 |
|---|---|---|---|
| 0 | 10 | 10 | 127 |
| 0 | 50 | 50 | 127 |
| 10 | 50 | 127 | 127 |

| 0 | 0 | 5 | 10 |
|---|---|---|---|
| 0 | 5 | 10 | 20 |
| 0 | 5 | 10 | 20 |
| 5 | 10 | 20 | 20 |

| 0 | 0 | 0 | 0 |
|---|---|---|---|
| 1 | 1 | 1 | 1 |
| 0 | 0 | 0 | 0 |
| 1 | 1 | 1 | 1 |

| 1 | 1 | 1 | 1 |
|---|---|---|---|
| 0 | 0 | 0 | 0 |
| 1 | 1 | 1 | 1 |
| 0 | 0 | 0 | 0 |

| 51 | 52 | 53 |
|---|---|---|
| 0xFFFF ⋮ | ⋮ | ⋮ |
| 0xF0F0 | 0x100 | 1 |
| ⋮ | ⋮ | ⋮ |
| 0x0F0F | 0x100 | 0 |
| ⋮ 0x0000 | ⋮ | ⋮ |

FIG. 18A

| k0 | k1 | k2 |
|----|----|----|
| k3 | k4 | k5 |
| k6 | k7 | k8 |

| 1  | 2  | 1  |
|----|----|----|
| 0  | 0  | 0  |
| −1 | −2 | −1 |

| 1 | 0 | −1 |
|---|---|----|
| 2 | 0 | −2 |
| 1 | 0 | −1 |

| −1 | −2 | −1 |
|----|----|----|
| 0  | 0  | 0  |
| 1  | 2  | 1  |

| −1 | 0 | 1 |
|----|---|---|
| −2 | 0 | 2 |
| −1 | 0 | 1 |

| 255 | 255 | 130 | 0 | 0 |
|-----|-----|-----|---|---|
| 255 | 255 | 110 | 0 | 0 |
| 255 | 255 | 130 | 0 | 0 |
| 255 | 255 | 110 | 0 | 0 |
| 255 | 255 | 130 | 0 | 0 |

| 255 | 255 | 0 | 0 | 0 |
|-----|-----|---|---|---|
| 255 | 255 | 0 | 0 | 0 |
| 255 | 255 | 0 | 0 | 0 |
| 255 | 255 | 0 | 0 | 0 |
| 255 | 255 | 0 | 0 | 0 |

| 0 | 0 | 0 | 1 |
|---|---|---|---|
| 0 | 0 | 0 | 1 |
| 0 | 1 | 1 | 1 |
| 0 | 1 | 1 | 1 |

| 0 | 0 | 0 | 1 |
|---|---|---|---|
| 0 | 0 | 1 | 1 |
| 0 | 0 | 1 | 1 |
| 0 | 1 | 1 | 1 |

| 0 | 0 | 0 | 1 |
|---|---|---|---|
| 0 | 0 | 1 | 1 |
| 0 | 0 | 1 | 1 |
| 0 | 1 | 1 | 1 |

IMAGE COMPRESSOR

BACKGROUND OF THE INVENTION

1. Field of the Invention

The present invention relates to an image compressor which compresses a multi-gradation image.

2. Description of the Related Art

Recently, a quantity of image data to be processed has greatly increased because the image becomes colored and multi-gradational. This has caused a data compressing method to be studied extensively which includes encoding in order to reduce the quantity of image data. There are many compressing methods which restore the image correctly to its original image after the compression due to the image encoding and so forth. However, a compressing method in which there is no problem even if the image is not restored correctly its original image has not greatly been studied.

In the conventional image compressor, a block approximate encoding method is performed in which each of the "R", "G" and "B" multi-gradational images is divided into a plurality of pixel blocks of adjacent pixels, which are then represented by two typical values and a block pattern produced by a binarizing process to thereby perform the image compression.

The block approximate encoding method performed in the conventional image compressor will be described with reference to FIGS. 31–33. FIG. 30 is a block diagram of the conventional image compressor. In FIG. 30, reference numeral 121 denotes the image compressor; 122 an image block-dividing unit; 123 a plane threshold value determining unit; and 124 a plane binarizing unit. FIG. 31A is a data diagram showing the block data of "R", FIG. 31B is a data diagram showing the block data of "G", and FIG. 31C is a data diagram showing the block data of "B". FIG. 32A is a data diagram showing the binarized data of "R", FIG. 32B is a data diagram showing the binarized data of "G", FIG. 32C is a data diagram showing the binarized data of "B", and FIG. 33 is a data composition diagram showing the compressed data according to the approximate encoding process in the conventional image compressor.

Each of the "R", "G" and "B" input image data is divided by the image block-dividing unit 122 into the image blocks each of which includes a plurality of adjacent pixels. The plane threshold value determining unit 123 obtains the average value of each of the block planes for the "R", "G" and "B" image block data block-divided by the image block block-dividing unit 122. The average value is used as a threshold value of each block plane. The image data in each block is compared with the threshold value of the block plane. The data performed the binarizing process on the basis of the result of the comparison, and two typical values, which comprises the average value of the original image data at the positions where the comparison results are larger and the average value of the original image data at the positions where the comparison results are smaller, are output as the compressed image data.

More specifically, FIGS. 31A–31C illustrate one example of the data for the respective block planes block-divided by the image block-dividing unit 122, and show the "R" plane block data 126, the "G" plane block data 127 and the "B" plane block data 128, respectively. In this example, the image data is divided into blocks of 4×4 adjacent pixels. Reference numeral 125 denotes one pixel, and the inner numerical value represents the 8-bits luminance data.

At this time, the plane threshold value determining unit 123 calculates the average value of the luminance data in each block for each of the plane block data 126–128 to produce the threshold value of each block. That is, the respective threshold values of the plane block data 126–128 shown in FIGS. 31A–31C are "47", "9" and "9", respectively. FIGS. 32A–32C show the results of performing the binarizing process using the threshold values in the plane binarizing unit 124. The results are the "R" plane binarized data 129, the "G" plane binarized data 130 and the "B" plane binarized data 131, respectively.

In FIG. 32A, the average value "89" ("59" in hexadecimal notation) of the luminance data of the pixels shown in FIG. 31A corresponding to the pixels of data "1" is handled a s the higher-luminance typical value. Similarly, in FIG. 32A, the average value "5" ("05" in hexadecimal notation) of the luminance data of the pixels shown in FIG. 31A corresponding to the pixels of data "0" is handled as the lower-luminance typical value. These apply to the pixels shown in FIGS. 32B and 32C.

Based on the above calculations, the typical values of the respective planes are represented as the "R" typical values "89" (0×59) and "5" (0×05), the "G" typical values "15" (0×0F) and "3" (0×03) and the "B" typical values "15" (0×0F) and "3" (0×03) in order of the higher-luminance typical value and the lower-luminance typical value. Each numerical value represents the 8-bit luminance value in the decimal notation, and the bracketed numerical value represents one in the corresponding hexadecimal notation. The notation with "0×" represents one in the hexadecimal notation. When the decimal number is set down with the hexadecimal number, the similar notations are used.

These data are encoded to obtain the data shown in FIG. 33. Reference numeral 132 represents the compressed data obtained according to the block approximate encoding method mentioned above. Reference numerals 133, 136 and 139 show the respective positions of the "R", "G" and "B" binarized block data. Reference numerals 134, 137 and 140 represent the respective positions of the "R", "G" and "B" higher-luminance typical values. Reference numerals 135, 138 and 141 represent the respective positions of the "R", "G" and "B" lower-luminance typical values. The binarized block data represents the array in which the binarized block data shown in FIG. 32 are arranged from left to right in row and from up to down in column (in FIG. 32A, "0001000101110111") in the hexadecimal notation (in FIG. 32A, "1171").

In the block approximate encoding method performed in the conventional image compressor, however, no binarized data is compressed and each plane has the binarized data. Thus, there is room to improve the compression rate by gathering the binarized data.

SUMMARY OF THE INVENTION

It is an object of the present invention to provide an image compressor which can improve the image compression rate by commonizing the binarized data of the luminance and chrominance data of the image, and can further improve the image compression rate by using the dictionaries represented in the number of the combinations less than the number of all possible combinations of the binarized data.

In order to achieve the above object, an image compressor according to the present invention comprises: a color space converting unit for separating an input image data into a luminance data and a chrominance data; an image block-dividing unit for block-dividing the luminance and chrominance data separated by the color space converting unit, using a plurality of adjacent pixels; a luminance threshold value determining unit for determining a threshold value with which a binarization of the luminance data block-divided in the image block-dividing unit is performed; a luminance binarizing unit for binarizing the block-divided luminance data using the threshold value determined by the luminance threshold value determining unit; a typical value forming unit for forming two typical values of the block-divided luminance and chrominance data in accordance with the luminance data binarized by the luminance binarizing unit; and a binarized luminance compressing unit for encoding the binarized luminance data using dictionaries whose number is smaller than the number of all combinations of the luminance data binarized by the luminance binarizing unit.

Thus, the image compressor is provided in which the image compression rate can be improved by commonizing the binarized data of the luminance and chrominance data of the image, and can be further improved by the dictionaries represented in the number of the combinations less than the number of all possible combinations of the binarized data.

BRIEF DESCRIPTION OF THE DRAWINGS

FIG. 6A is a data diagram illustrating the block-divided "U";

FIG. 6B is a data diagram illustrating the block-divided "V";

FIGS. 13A and 13B are data diagrams each illustrating the binarized luminance data in the image compressor shown in FIG. 12;

FIG. 13C is a data diagram illustrating a dictionary in the image compressor shown in FIG. 12;

FIGS. 18A–18E are data diagrams each representing a coefficient matrix in an edge detecting unit;

FIGS. 19A and 19B are data diagrams each representing the luminance change in an edge adjacent position luminance value changing unit;

FIG. 32A is a data diagram illustrating the "R" binarized data;

FIG. 32B is a data diagram illustrating the "G" binarized data;

FIG. 32C is a data diagram illustrating the "B" binarized data;

DETAILED DESCRIPTION OF THE EMBODIMENTS

Now, the embodiments of the present invention will be described with reference to FIGS. 1–29.

(First Embodiment)

Figure 1:
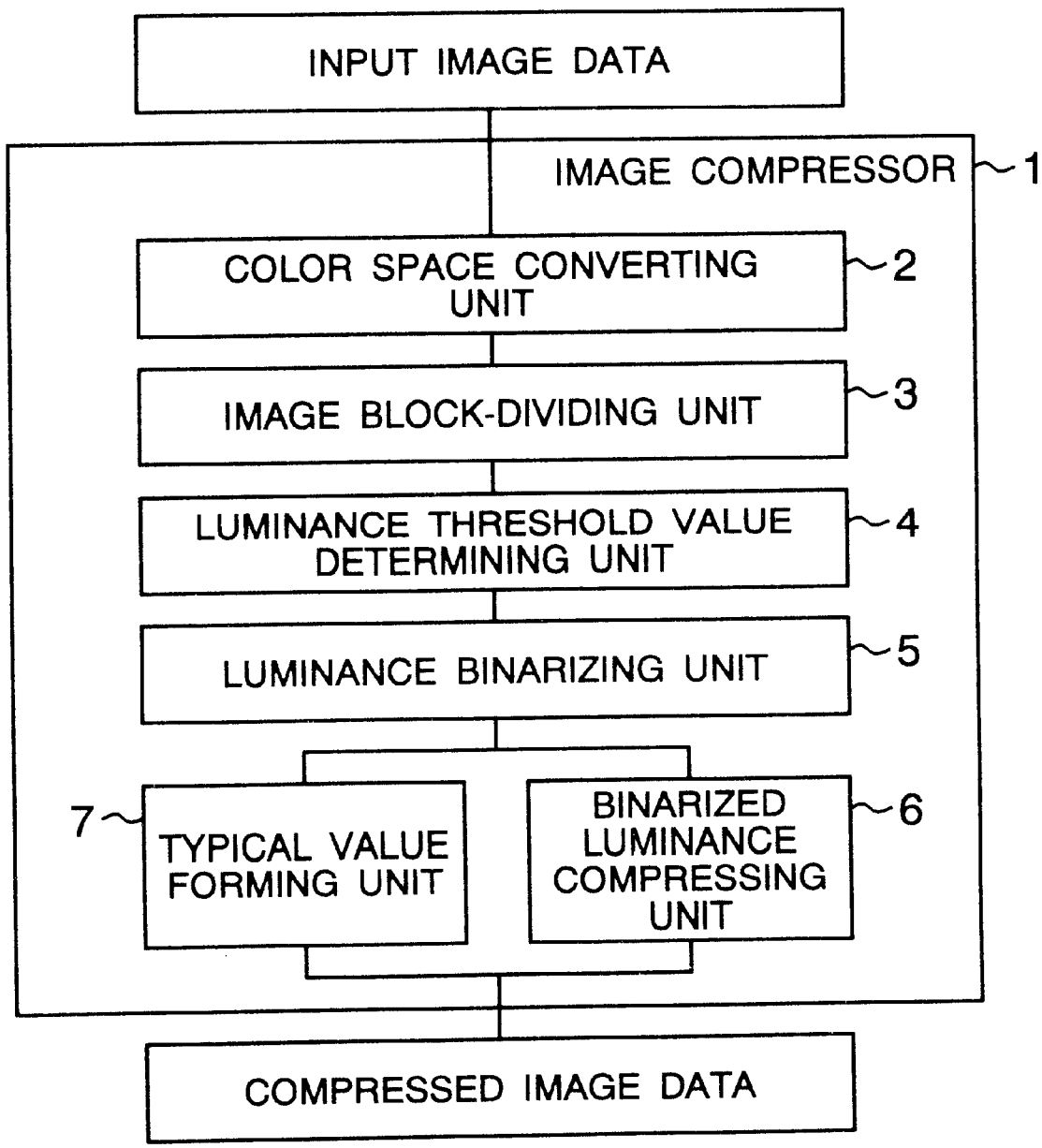
FIG. 1 is a block diagram of an image compressor according to a first embodiment of the present invention.

FIG. 1 is a block diagram of an image compressor according to a first embodiment of the present invention. In FIG. 1, reference numeral 1 denotes the image compressor; 2 a color space converting unit; 3 an image block-dividing unit; 4 a luminance threshold value determining unit; 5 a luminance binarizing unit; 6 a binarized luminance compressing unit; and 7 a typical value forming unit.

Figure 2:
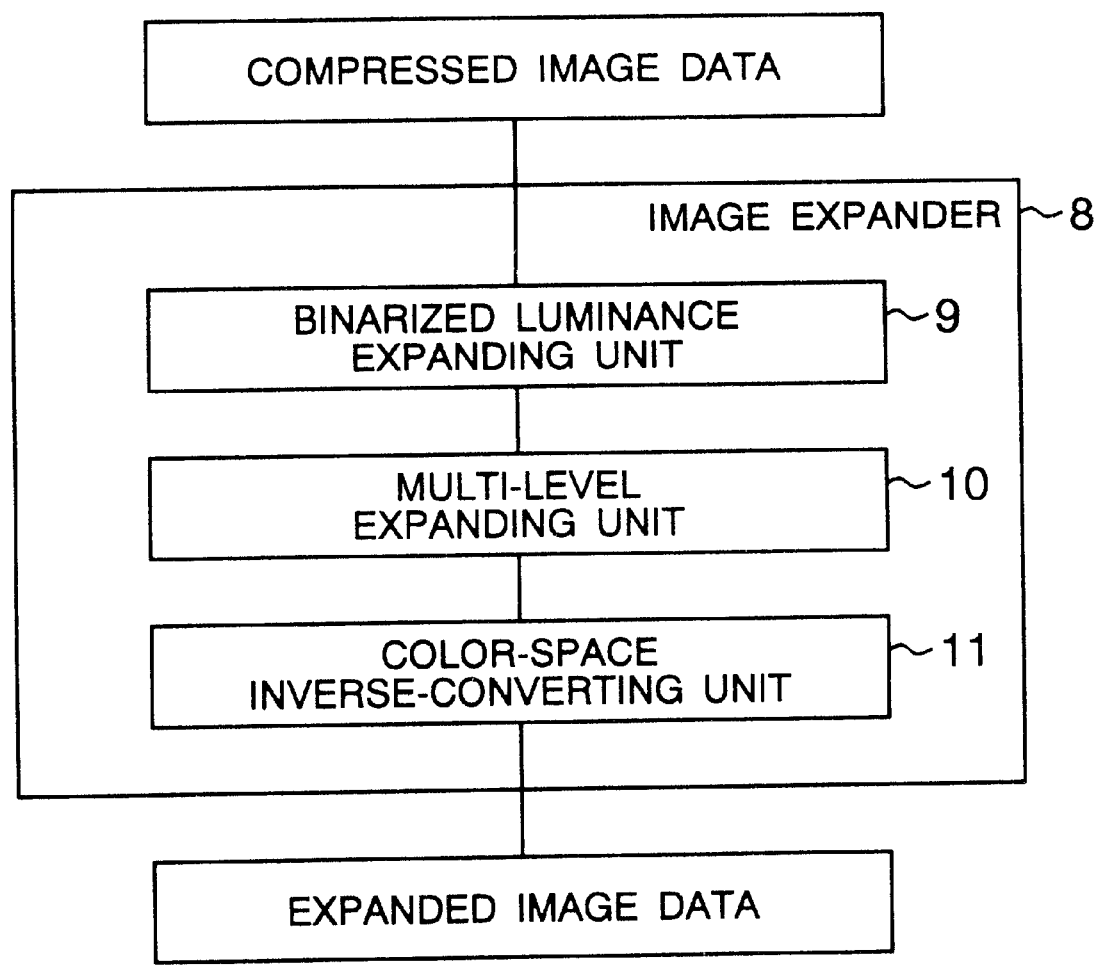
FIG. 2 is a block diagram of an image expander for expanding a compressed image from the image compressor shown in FIG. 1.
Figure 3:
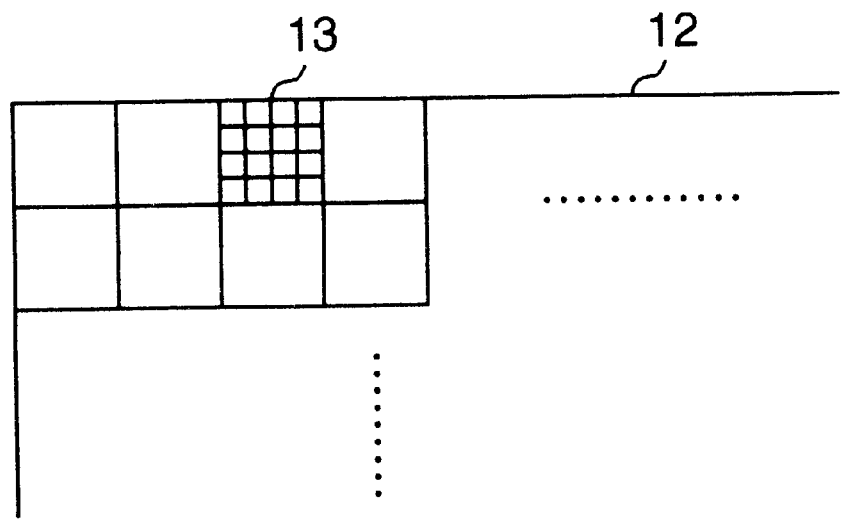
FIG. 3 illustrates the function of an image block-dividing unit.
Figure 4:
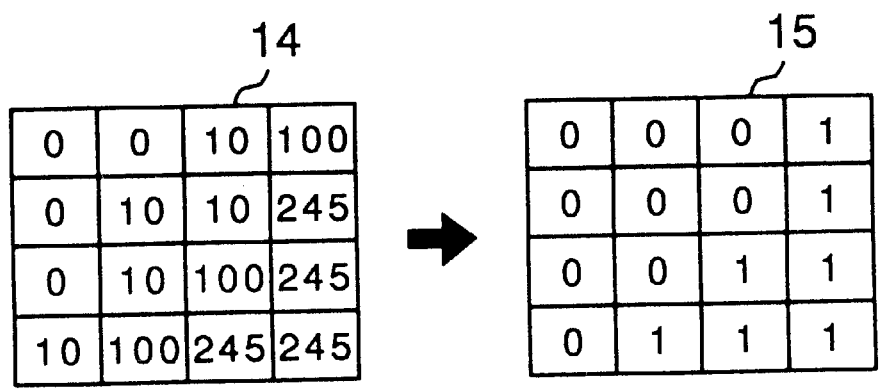
FIG. 4 illustrates the function of a luminance binarizing unit.
Figure 5A:
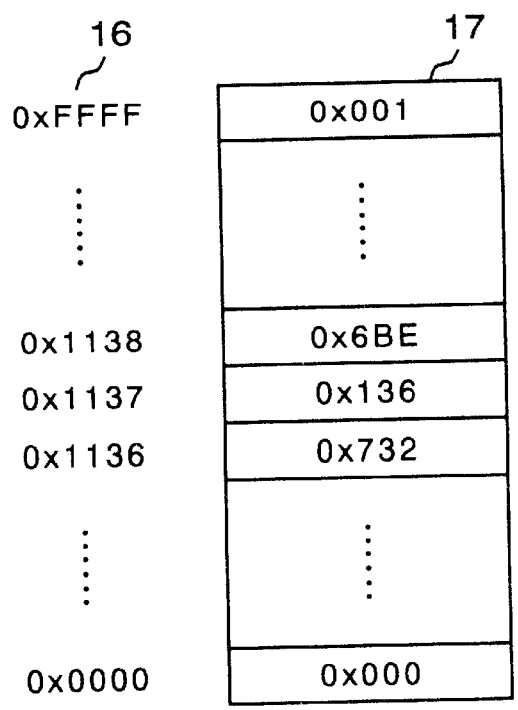
FIG. 5A is a data diagram representing a dictionary in a binarized luminance compressing unit.
Figure 5B:
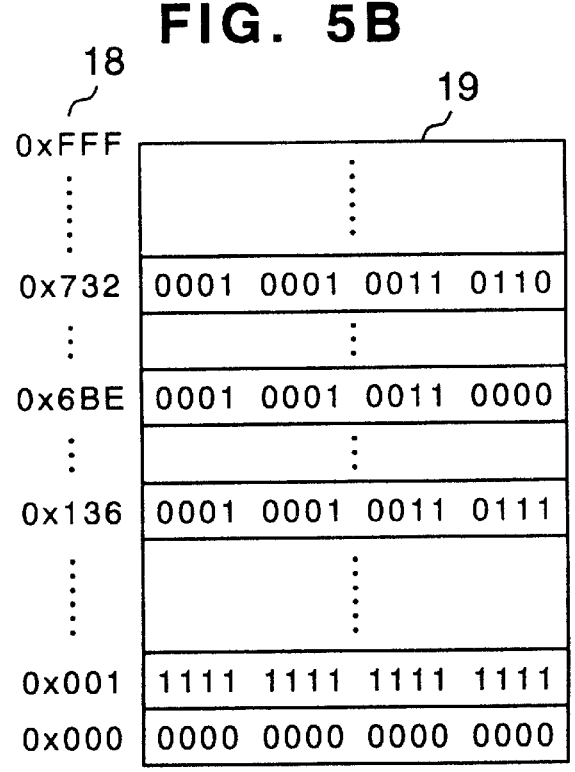
FIG. 5B is a data diagram representing a decoding dictionary in the image expander shown in FIG. 2.
Figure 7:
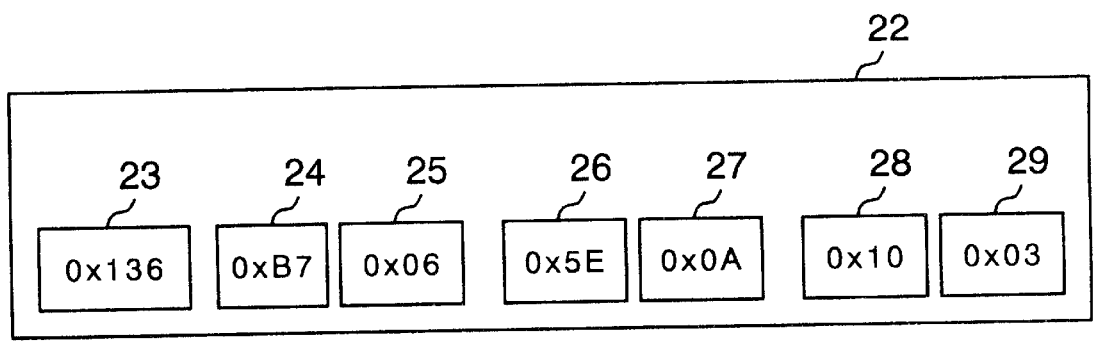
FIG. 7 is a data composition diagram illustrating the block compressed data.

The function, operation and so forth of the image compressor 1 will be described next with reference to FIGS. 2–7. FIG. 2 is a block diagram of an image expander for expanding a compressed image from the image compressor 1. FIG. 3 illustrates the function of the image block-dividing unit 3. FIG. 4 illustrates the function of the luminance binarizing unit 5. FIG. 5A is a data diagram representing an encoding dictionary in the binarized luminance compressing unit 6. FIG. 5B is a data diagram representing a decoding dictionary in the binarized luminance expanding unit of the image expander shown in FIG. 2. FIG. 6A is a data diagram illustrating a block-divided "U". FIG. 6B is a data diagram illustrating a block-divided "V". FIG. 7 is a data composition diagram illustrating block compressed data. In FIG. 2, reference numeral 8 denotes an image expander; 9 a binarized luminance expanding unit; 10 a multi-level expanding unit; and 11 a color-space inverse-converting unit.

The color space converting unit 2 shown in FIG. 1 converts the RGB color space of the input image data to the YUV luminance/color difference space in accordance with the following expressions (1)–(3):

$$Y=0.2990R+0.5870G+0.1140B \quad (1)$$

$$U=-0.1684R-0.3316G+0.5000B \quad (2)$$

$$V=0.5000R-0.4188G-0.0813B \quad (3)$$

where "R", "G", "B" and "Y", "U" and "V" are each composed of 8-bits data, "Y" represents the luminance, and "U" and "V" each represent the hue. The image block-dividing unit 3 divides the image into a plurality of blocks each of which includes the adjacent pixels. The division of blocks is performed as shown in FIG. 3.

In FIG. 3, reference numeral 12 denotes the image data. Reference numeral 13 denotes one block of 16-pixels. The division of blocks is performed for the planes of the "Y", "U" and "V".

The compression of the luminance data "Y" will be described next. The luminance threshold value determining unit 4 shown in FIG. 1 obtains the average value of the luminance data in each block, and sets the average value as the threshold value for the binarization. The luminance binarizing unit 5 outputs "1" when the luminance component of any one of pixels of the image data block is higher than the threshold value, and outputs "0" when it is lower than the threshold value.

FIG. 4 illustrates the binarizing process. In FIG. 4, reference numeral 14 denotes the luminance plane data of the block-divided image. The luminance threshold value determining unit 4 outputs the average value of the luminance plane data 14 (in this example, "83") as the luminance threshold value. The luminance binarizing unit 5 performs the comparison with the threshold value to output the luminance binarized data 15.

The binarized luminance compressing unit 6 arranges the binarized data 15 from left to right in row and from up to down in column. In this case, the data has the data amount of 216, so that the approximate data are collected from those data and their most significant 4-bits are compressed so as to obtain the 212 data.

In a n example of the binarized data 15 shown in FIG. 4, the following data is produced.

(0, 0, 0, 1, 0, 0, 0, 1, 0, 0, 1, 1, 0, 1, 1, 1)

Assume that the head and tail of this data are the most and least significant bits, respectively, this data is then expressed as (0×1137) in the hexadecimal notation. Assume that the data belongs to the classification (0×136) at a dictionary address 17. In this case, the code data (0×136) is obtained as the address of the encoding dictionary, which is then disposed at the binarized luminance position 23 (FIG. 7).

As described above, the binarized luminance data is encoded using the binarized luminance data 15 and the dictionary having the dictionary address 16 and dictionary data 17 shown in FIG. 5A (the binary typical number of this dictionary is "4096" (the maximum data is 0xFFF: 4096 typical)).

The contents of the dictionary data 17 shown in FIG. 5A correspond to the addresses of the decoding dictionary which has the address 18 and data 19 shown in FIG. 5B used for expanding the compressed data. The decoding dictionary data 19 in which the contents of the dictionary data 17 are specified as the address 18 in the decoding dictionary is one binarized decoding data.

The typical value forming unit 7 shown in FIG. 1 disposes in the block luminance data 14 the average value "183" (0×B7) of the pixels where the binarized data 15 is "1" and the average value "6" (0×6) of the pixels where the binarized data 15 is "0" at the positions 24 and 25 of the higher- and lower-luminance typical values, respectively, of the block compressed data 22 shown in FIG. 7. The "U" and "V" plane block data 20 and 21 shown in FIGS. 6A and 6B are converted to two typical values using the binarized luminance data 15.

For the "U" and "V" plane block data 20 and 21, their typical values are similarly calculated. The average value of the pixels corresponding to "1" of the binarized luminance data 15 and the average value of the pixels corresponding to "0" of the binarized luminance data 15 are calculated. The pixel average value "94" (0×5E) of "U"="1" is disposed at the "U" higher-luminance typical value position 26 of the block compressed data 22, and the pixel average value "10" (0×0A) of "U"="0" is disposed at the "U" lower-luminance typical value position 27. Also, the pixel average value "16" (0×10) of "V"="1" is disposed at the "V" higher-luminance typical value position 28 of the block compressed data 22, and the pixel average value "13" (0×03) of "V"="0" is disposed at the "V" lower-luminance typical value position 29.

In this way, the block compressed data is finally obtained as the block compressed data 22 shown in FIG. 7. By the above process, the data is compressed.

The expansion of the compressed data will be described next. In the image expender 8 shown in FIG. 2, the binarized luminance expanding unit 9 first uses as the address the binarized luminance data code value 23 of the compressed image data (block compressed data) 22, and the decoding dictionary which has the decoding dictionary address 18 and data 19 shown in FIG. 5B to obtain the decoding dictionary data as the binarized luminance data. Assuming that the compressed image data is "22", for example, the expanded binarized luminance data is the expansion dictionary data (0001000100110111) (bit data) at the expansion dictionary address (0×136).

The multi-level expanding unit 10 performing the data expansion using the binarized luminance data expanded by the binarized luminance expanding unit 9 and the respective plane typical values. For the luminance plane, the expansion of the block luminance plane is performed by replacing the value at the position of the binarized luminance data="1" with the value of the higher-luminance typical value 24 and by replacing the value at the position of the expanded binarized luminance data="0" with the value of the lower-luminance typical value 25 of the compressed image data 22 shown in FIG. 7.

For the color difference plane, the expansion of the block data in the "U" plane is performed by replacing the data at the position of the binarized luminance data="1" with the data of the "U" higher-luminance typical value position 26 of the compressed image data 22 shown in FIG. 7 and by replacing the data at the position of the binarized luminance data="0" with the data of the "U" lower-luminance typical value position 27 of the compressed image data 22. Similarly, the expansion of the block data in the "V" plane is performed by replacing the data at the position of the binarized luminance data="1" with the data of the "V" higher-luminance typical value position 29 of the compressed image data 22 shown in FIG. 7 and by replacing the data at the position of the binarized luminance data="0" with the data of the "V" lower-luminance typical value position 27 of the compressed image data 22.

Then, the "G", "G" and "B" expansion data are obtained based on the "Y", "U" and "V" expanded block data in the color-space inverse-converting unit 11 in accordance with the following expressions (4)–(6):

$$R=Y+1.4020V \quad (4)$$

$$G=Y-0.3441U-0.7139V \quad (5)$$

$$B=Y+1.7718U-0.0012V \quad (6)$$

As described above, according to the present embodiment, it is possible to improve the image compression rate by performing the encoding process using only the binarized luminance data and further using the dictionary which has the small number of data (its maximum value is 0×FFF) than the maximum possible number of the combinations of the binarized luminance data (0×FFFF).

(Second Embodiment)

Figure 8:
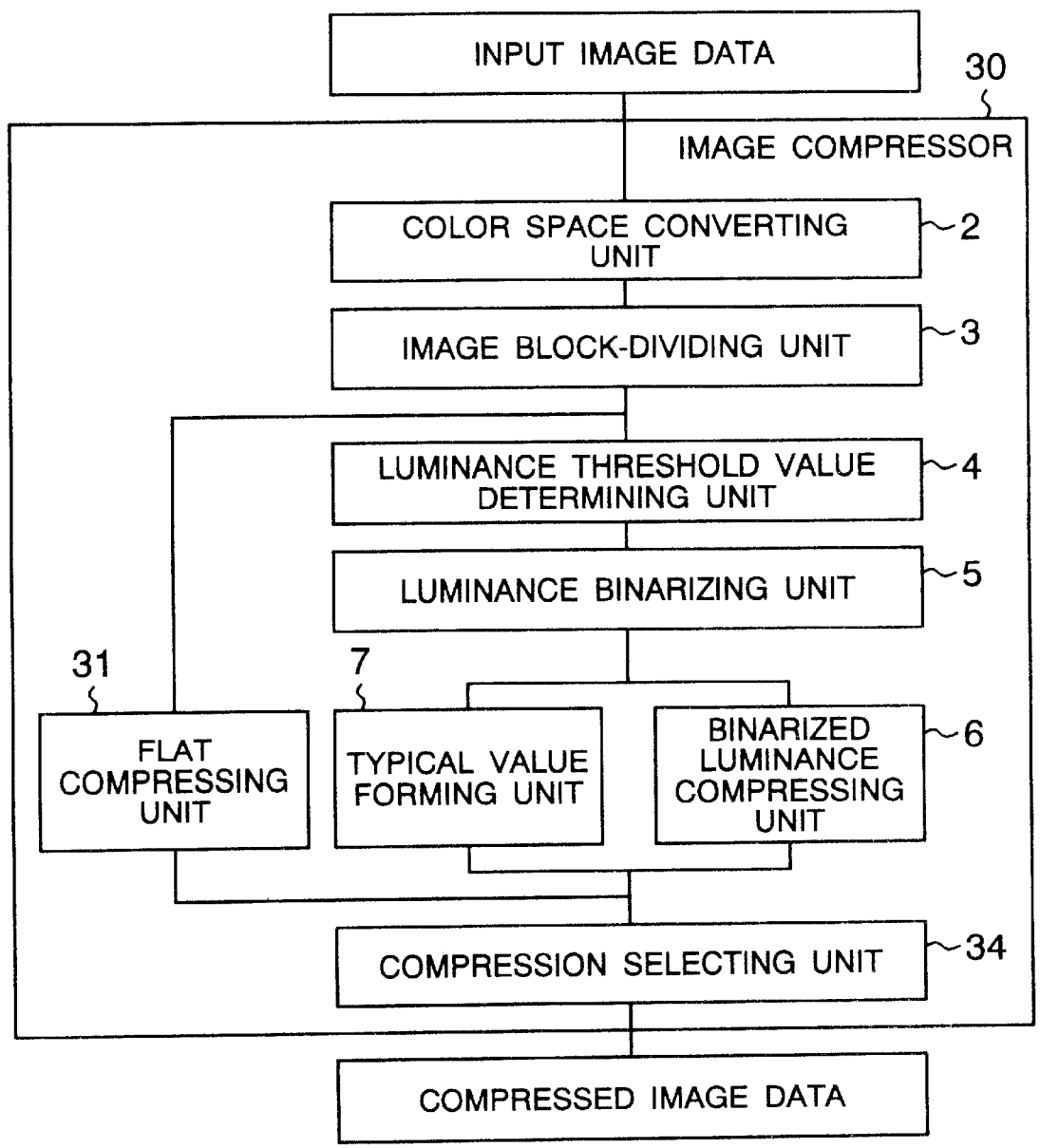
FIG. 8 is a block diagram of an image compressor according to a second embodiment of the present invention.

FIG. 8 is a block diagram of an image compressor according to a second embodiment of the present invention. In FIG. 8, a color space converting unit 2, an image block-dividing unit 3, a luminance threshold value determining unit 4, a luminance binarizing unit 5, a binarized luminance compressing unit 6, and a typical value forming unit 7 are identical to the corresponding ones shown in FIG. 1. Thus, the further description thereof will be omitted. Reference numeral 30 denotes the image compressor; 31 a flat compressing unit, and 32 a compression selecting unit.

The functions and operation of the image compressor of this embodiment will be described next. The functions and operation of up to the typical value forming unit 7 are similar to those of the corresponding elements of the first embodiment. Thus, the further description thereof will be omitted. The flat compressing unit 31 shown in FIG. 8 performs the compression process using the "Y", "U" and "V" average values of each block and the average values of the luminance and color difference of each block as the codes. That is, two typical values, i.e. the higher- and lower-luminance typical values, are not set. The compressor selecting unit 32 employs the codes of the flat compressing unit 31 as the compressed image data when the difference between the higher- and lower-luminance typical values obtained in the binarized luminance compressing unit 6 is smaller than the threshold value of "83". If otherwise, the compressor selecting unit 32 employs the codes output from the binarized luminance compressing unit 6 and typical value forming unit 7 as the compressed image data.

As described above, in the present embodiment, when the difference between the luminance typical values is small, the luminance average value and the color difference average value alone are used, and no binarized luminance compressed data is required to be had. Thus, the compression rate is further improved.

(Third Embodiment)

Figure 9:
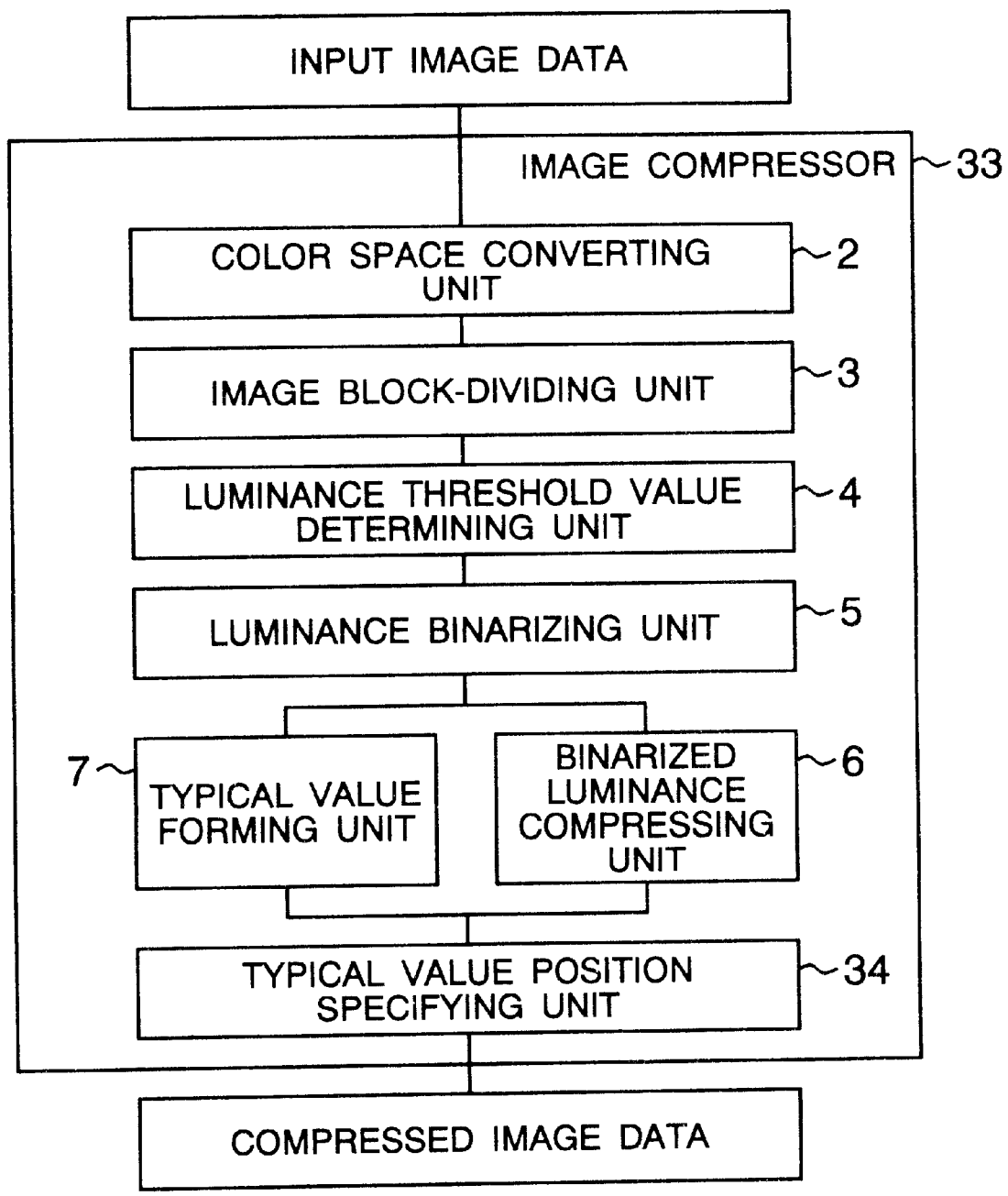
FIG. 9 is a block diagram of an image compressor according to a third embodiment of the present invention.

FIG. 9 is a block diagram of an image compressor according to a third embodiment of the present invention. In FIG. 9, a color space converting unit 2, an image block-dividing unit 3, a luminance threshold value determining unit 4, a luminance binarizing unit 5, a binarized luminance compressing unit 6, and a typical value forming unit 7 are similar to the corresponding ones shown in FIG. 1. Thus, the further description thereof will be omitted. Reference numeral 33 denotes the image compressor; and 34 a typical value position specifying unit.

Figures 10A, 10B:
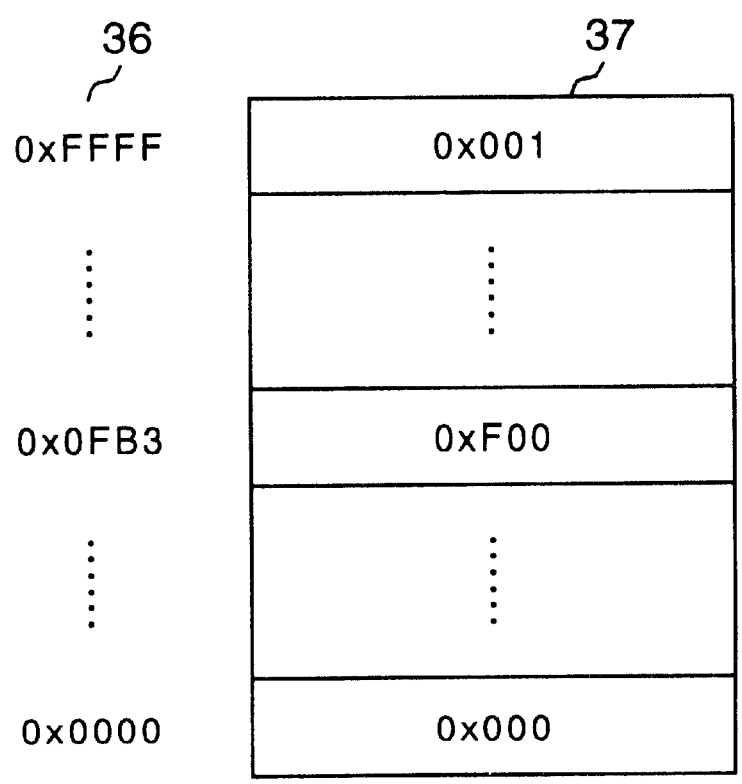
FIG. 10A is a data diagram illustrating the binarized luminance data in the image compressor shown in FIG. 9.
FIG. 10B is a data diagram representing a dictionary in the image compressor shown in FIG. 9.
Figure 11:
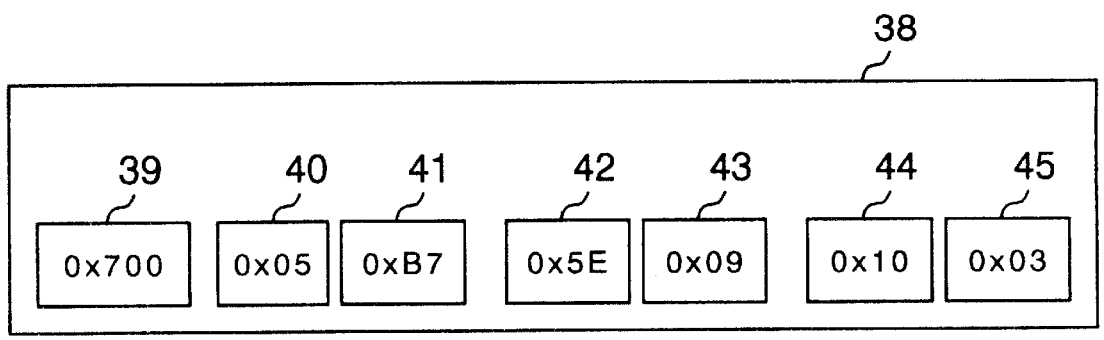
FIG. 11 is a data composition diagram illustrating the block compressed data in the image compressor shown in FIG. 9.

The functions and operation of the image compressor 33 of this embodiment will be described next with reference to FIG. 3, 10A, 10B and 11. FIG. 10A is a data gram illustrating the binarized luminance data in the image compressor 33. FIG. 10B is a data diagram illustrating a dictionary in the image compressor 33. FIG. 11 is a data composition diagram illustrating the block compressed data in the image compressor 33.

The functions and operation of up to the luminance binarizing unit 5 are similar to those of the corresponding elements of the first embodiment. Thus, the further description thereof will be omitted. The binarized luminance compressing unit 6 encodes the binarized luminance data using the binarized luminance data 35 shown in FIG. 10A obtained in the luminance binarizing unit 5 and the dictionary which has the address 36 and data 37 shown in FIG. 10B. In the example of FIG. 10, the binarized luminance data (0×0FB3) is obtained and it is used as the address 36 to obtain the code data (0×F00). For the block luminance data, the average value of the pixels where the binarized luminance data obtained by the luminance binarizing unit 5 are "1" is obtained as the higher-luminance typical value. Also, the average value of the pixels where the binarized luminance data obtained by the luminance binarizing unit 5 are "0" is obtained as the lower-luminance typical value. When the most significant bit of the binarized luminance obtained by the dictionary of the codes produced by the binarized luminance compressing unit 6 is "0", the typical value position specifying unit 34 places the higher-luminance typical value at the higher-luminance typical value position 40 shown in FIG. 11 and the lower-luminance typical value at the lower-luminance typical value position 41. When the most significant bit is "1", the typical value position specifying unit 34 places the higher-luminance typical value at the lower-luminance value typical position 41 and the lower-luminance typical value at the higher-luminance typical value position 40. In the example of FIG. 10, since the dictionary data obtained by the binarized luminance compressing unit 6 is "0×F00" and the most significant bit is "1", the higher- and lower-luminance typical values are replaced with each other with respect to the position like the block compressed data 38 shown in FIG. 11. The most significant bit of the binarized luminance compressed data 39 is deleted as shown by (0×700) for the dictionary data (0×F00).

The typical value forming unit 7 shown in FIG. 9 forms two typical values based on the "Y", "U" and "V" plane block data using the binarized luminance data obtained in the luminance binarizing unit 5. That is, the typical value forming unit 7 calculates the average values of the pixels corresponding to the respective binarized luminance data "1" and "0", and obtains the "U" higher- and lower-luminance typical values and the "V" higher- and lower-luminance typical values. The obtained data are used as the block compressed data 38. For the block compressed data 38 of FIG. 11, reference numeral 39 denotes a binarized luminance compressed data; 40 a higher-luminance typical value position; 41 a lower-luminance typical value position; 42 a "U" higher-luminance typical value position; 43 a "U" lower-luminance typical value position; 44 a "V" higher-luminance typical value position; and 45 a "V" lower-luminance typical value position as in the example of FIG. 7.

As described above, in the present embodiment, by replacement of the luminance typical values, one bit of the binarized luminance compressed data is represented. Thus, the number of the code bits obtained from the binarized luminance compressing unit 6 is reduced. Therefore, the compression rate is further improved.

(Fourth Embodiment)

Figure 12:
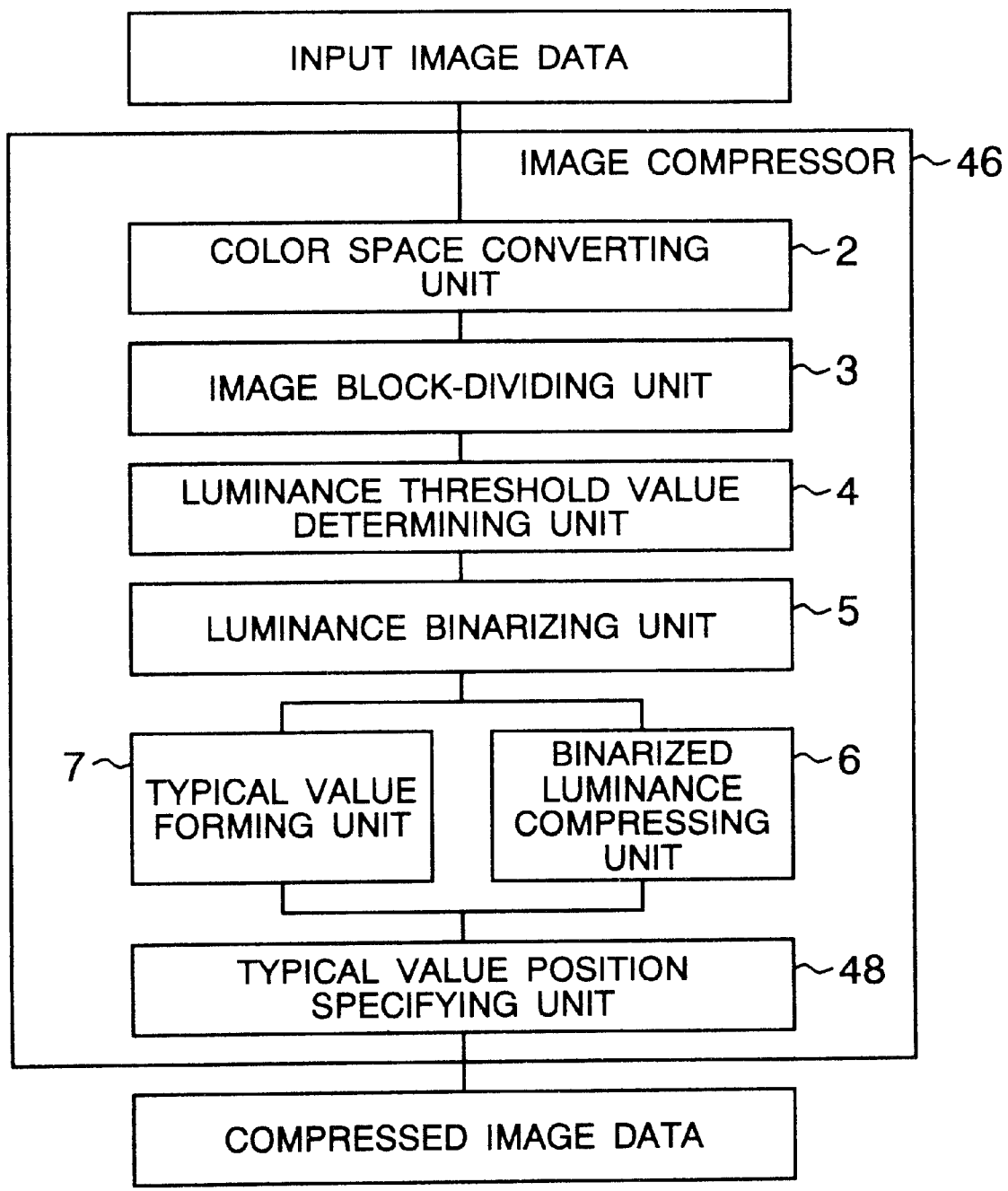
FIG. 12 is a block diagram of an image compressor according to a fourth embodiment of the present invention.

FIG. 12 is a block diagram of an image compressor according to a fourth embodiment of the present invention. In FIG. 12, a color space converting unit 2, an image block-dividing unit 3, a luminance threshold value determining unit 4, a luminance binarizing unit 5, and a typical value forming unit 7 are similar in the composition and operation to the corresponding ones shown in FIG. 1. Thus, the further description thereof will be omitted. Reference numeral 46 denotes the image compressor; 47 a binarized luminance compressing unit; and 48 a typical value position specifying unit.

Figure 14A:
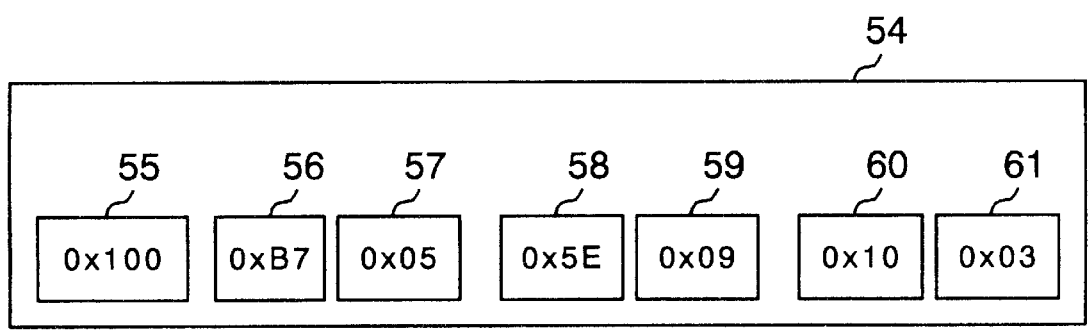
FIGS. 14A and 14B are data composition diagrams each illustrating the block compressed data in the image compressor shown in FIG. 12.
Figure 14B:
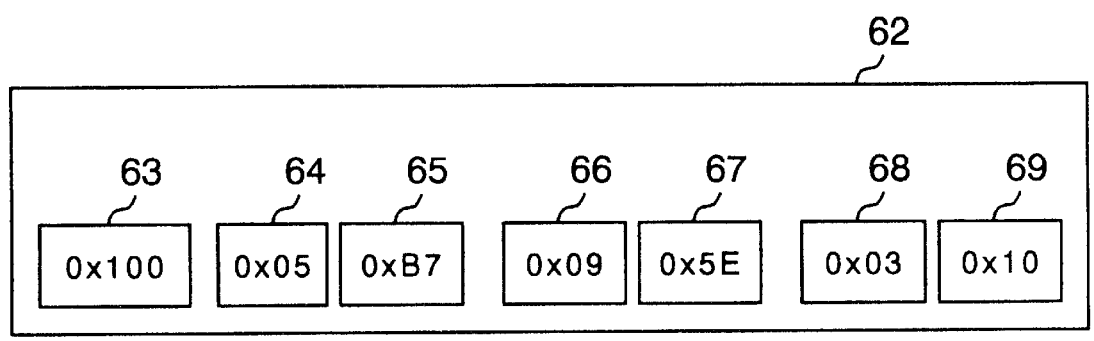
Figures 15A, 15B, 15C:
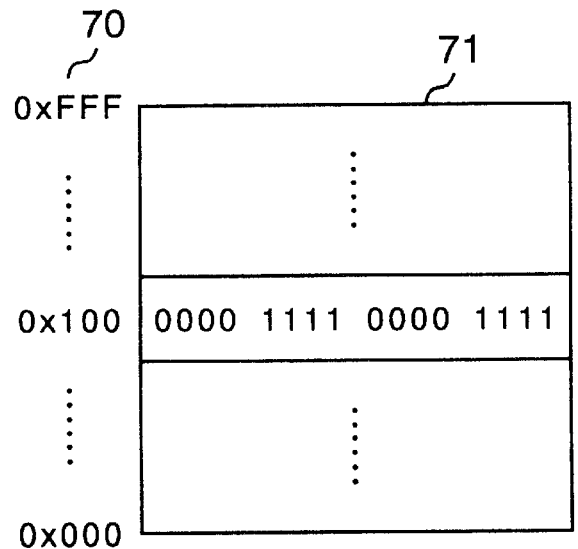
FIG. 15A is a data diagram representing a decoding dictionary.
FIGS. 15B and 15C are data diagrams each representing the expansion of the binarized luminance data.

The functions and operation of the image compressor 46 of this embodiment will be described next with reference to FIGS. 3, 13A, 13B, 13C, 14A, 14B, 15A, 15B and 15C. FIGS. 13A and 13B are data diagrams illustrating the binarized luminance data in the image compressor 46 shown in FIG. 12. FIG. 13C is a data diagram illustrating the dictionary in the image compressor 46. FIGS. 14A and 14B are data composition diagrams illustrating the compressed block data in the image compressor 46. FIG. 15A is a data diagram illustrating the decoding dictionary. FIGS. 15B and 15C are data diagrams illustrating the expansion of the binarized luminance data.

The functions and operation of up to the luminance binarizing unit 5 shown in FIG. 12 are similar to those of the corresponding elements of the first embodiment. Thus, the further description thereof will be omitted. The binarized luminance compressing unit 47 encodes the binarized luminance data using the binarized luminance data 49 and 50 shown in FIGS. 13A and 13B obtained in the luminance binarizing unit 5, and the dictionary which has the address 51, the data 52 and the dictionary identifying data 53 shown in FIG. 13C. In the example of FIG. 13, the same code data "0×100" is obtained for the two luminance data 49 and 50. The identification data "0" and "1" are obtained for the block luminance data 49 and 50, respectively. For the block luminance data 49 and 50, the average value of the pixels where the binarized luminance data obtained by the luminance binarizing unit 5 is "1" is obtained as the higher-luminance typical value. Also, the average value of the pixels where the binarized luminance data obtained by the luminance binarizing unit 5 is "0" is obtained as the lower-luminance typical value. When the identification data obtained by the dictionary of the codes produced by the binarized luminance compressing unit 47 is "0", the typical value position specifying unit 48 places the higher-luminance typical value at the higher-luminance typical value position and the lower-luminance typical value at the lower-luminance typical value position. Also, when the identification data is "1", the typical value position specifying unit 48 places the higher-luminance typical value at the lower-luminance typical value position and the lower-luminance typical value at the higher-luminance typical value position. The block compressed data 54 and 62 obtained from the binarized luminance data 49 and 50 shown in FIGS. 13A and 13B are shown in FIGS. 14A and 14B, respectively. Since the identification data corresponding to the binarized luminance data 50 is "1", the higher- and lower-luminance typical values of the block compressed data 62 are replaced with each other with reference to position. Reference numerals 54 and 62 shown in FIGS. 14A and 14B denote the compressed block data; 55 and 63 the binarized luminance compressed data; 56 and 64 the higher-luminance typical value positions; 57 and 65 the lower-luminance typical value positions; 58 and 66 the "U" higher-luminance typical value positions; 59 and 67 the "U" lower-luminance typical value positions; 60 and 68 the "V" higher-luminance typical value positions; and 61 and 69 the "V" lower-luminance typical value positions. The typical value forming unit 7 shown in FIG. 12 produces two typical values based on the "Y", "U" and "V" plane block data using the binarized luminance data obtained in the luminance binarizing unit 5. That is, the typical value forming unit 7 calculates the average values of the pixels corresponding to the respective binarized luminance data "1" and "0", and obtains the "U" higher- and lower-luminance typical values and the "V" higher- and lower-luminance typical values. The data compression is performed in the above process.

FIGS. 15A–15C illustrate the development of the binarized luminance compressed data of the block compressed data obtained in FIG. 14. The binarized luminance compressed data 56 and 63 are expanded by the decoding dictionary having the address 70 and the data 71. Both the binary expansion addresses are (0×100) to obtain data (000011100001111) (binary). Since the higher- and lower-luminance typical values of the block compressed data 62 are replaced with each other with respect to the position (0×05<0×B7), the developed binarized data of the block compressed data 62 becomes the binarized luminance developed data 73 in the form of the inverted bit of the dictionary data. The luminance typical values of the block compressed data 54 are not replaced with each other with respect to the position (0×B7>0×05), so that the block compressed data becomes the binarized luminance developed data 72. As described above, the binarized luminance compressed data is developed.

As described above, in the present embodiment, by replacement of the luminance typical values, the typical bit-inversion of the dictionary used in the encoding of the binarized luminance data is represented. Thus, the number of bits obtained by the binarized luminance compressing unit 47 is reduced, and hence the compression rate is further improved.

(Fifth Embodiment)

Figure 16:
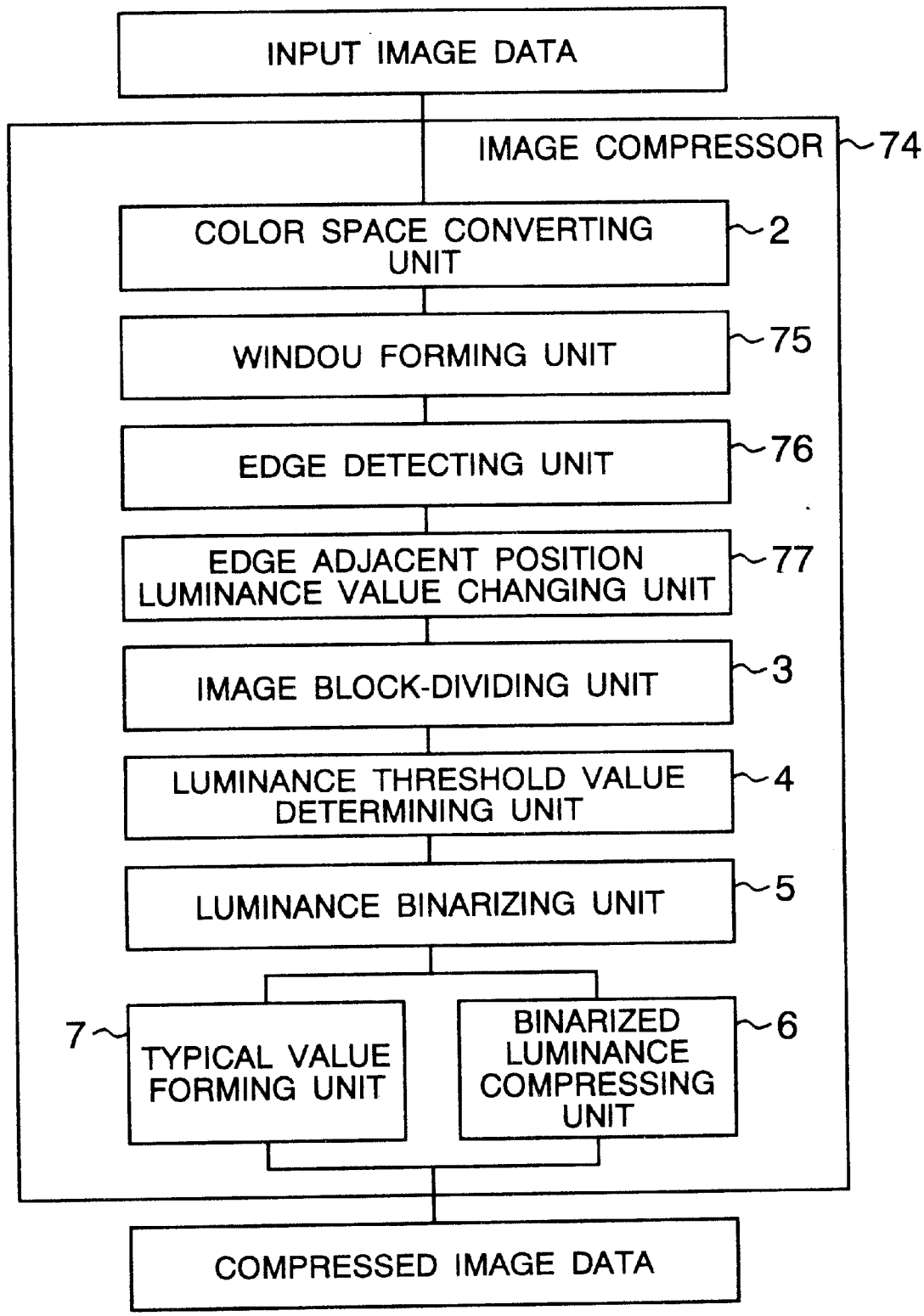
FIG. 16 is a block diagram of an image compressor according to a fifth embodiment of the present invention.

FIG. 16 is a block diagram of an image compressor according to a fifth embodiment of the present invention. In FIG. 16, a color space converting unit 2, an image block-dividing unit 3, a luminance threshold value determining unit 4, a luminance binarizing unit 5, a binarized luminance compressing unit 6, and a typical value forming unit 7 are similar in the composition and operation to the corresponding ones shown in FIG. 1. Thus, the further description thereof will be omitted. Reference numeral 74 denotes the image compressor; 75 a window forming unit, 76 an edge detecting unit, and 77 an edge adjacent position luminance value changing unit.

Figure 17:
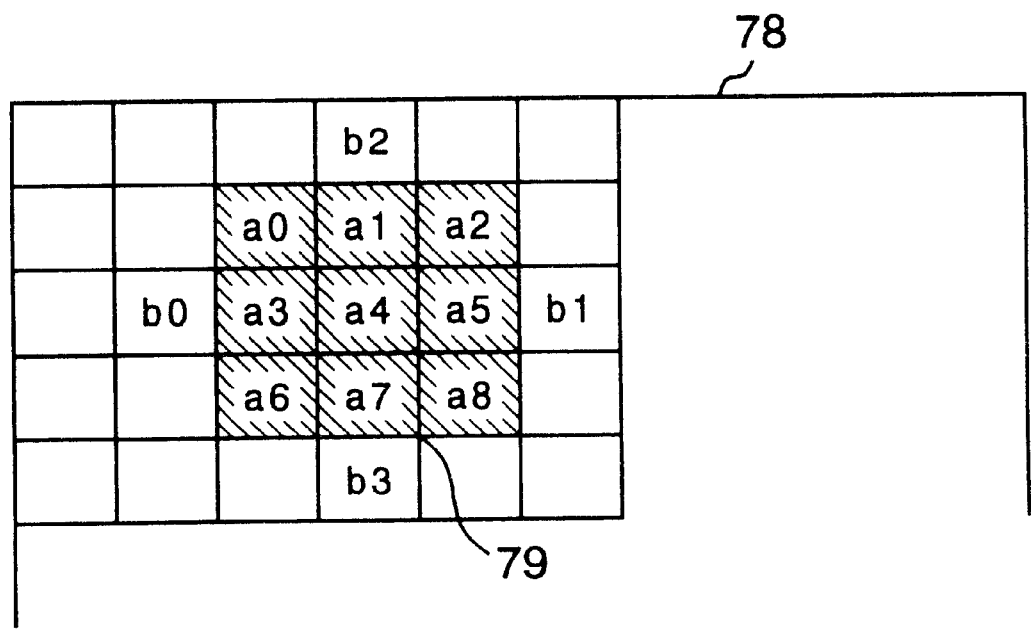
FIG. 17 is a data diagram for explaining the operation of a window forming unit.

The functions and operation of the image compressor 74 of this embodiment will be described next with reference to FIGS. 3, 5, 17, 18A–18E, 19A and 19B. FIG. 17 is a data diagram illustrating the operation of the window forming unit 75. FIGS. 18A–18E are data diagrams illustrating a coefficient matrix in the edge detecting unit 76. FIGS. 19A and 19B are data diagrams illustrating the luminance change in the edge adjacent position luminance value changing unit 77.

The window forming unit 75 shown in FIG. 16 forms a window 79 of 3×3 pixels for the luminance plane as shown in FIG. 17. Reference numeral 78 denotes a luminance plane image. The window 79 moves the image every one pixel from left to right and then from up to down. The edge detecting unit 76 performs the following calculation on the window 79 formed by the window forming unit 75 using the coefficients of the edge detection coefficient matrix 80 (FIG. 18A):

An edge quantity=$\Sigma(ai \times ki)$ ($i$=0, 1, 2, . . . , 8)  (7)

The edge detection coefficient matrix 80 has four kinds of coefficients. The edge detecting unit 76 calculates the respective edge quantities, and determines the edge quantity and direction based on the maximum edge quantity. When the edge quantity using a downward edge detection coefficient matrix 81 of FIG. 18B is maximum, the downward edge is determined. When an edge quantity using a rightward edge detection coefficient matrix 82 of FIG. 18C is maximum, the rightward edge is determined. When an edge quantity using an upward edge detection coefficient matrix 83 of FIG. 18D is maximum, the upward edge is determined. When an edge quantity using a leftward edge detection coefficient matrix 84 of FIG. 18E is maximum, the leftward edge is determined. The respective edge determining positions should be at a4 (FIG. 17) of the window. The edge direction and quantity thus obtained are used so that when the edge quantity is larger than the threshold value 200 (preset empirical value), the position a4 is used as an edge position. In this case, the edge adjacent position luminance value changing unit 77 changes the luminance at an adjacent position. In the case of the downward edge, the luminance at the position b3 is replaced with that at the position a7. In the case of the rightward edge, the luminance at the position b1 is replaced with that at the position a5. In the case of the upward edge, the luminance at the position b2 is replaced with that at the position a1. In the case of the leftward edge, the luminance at the position b0 is replaced with that at the position a3.

FIGS. 19A and 19B show an example of changing the luminance value. A tilted position luminance of the rightward edge is changed, as shown by reference numeral 86, using the hatched positions denoted by reference numeral 85 as the edge positions. The operations of the image block-dividing unit 3 and other subsequent elements are similar to those of the corresponding ones of the first embodiment. Thus, the further description thereof will be omitted except for the operation of the typical value forming unit 7.

In the typical value forming unit 7 shown in FIG. 16, two typical values are formed based on the "Y", "U" and "V" plane block data using the binarized luminance data obtained by the luminance binarizing unit 5. The average value of the pixels corresponding to the respective binarized luminance data "1" and the average value of the pixels corresponding to the respective binarized luminance data "0" are calculated to obtain the "U" higher- and lower-luminance typical values and the "V" higher- and lower-luminance typical values. The data thus obtained should be used as the block compressed data.

As described above, in the present embodiment, by changing the luminance at the edge adjacent positions, the difference between the luminance at the edge positions is increased to thereby reduce the unevenness in th edge which will possibly occur when the luminance is binarized.

(Sixth Embodiment)

Figure 20:
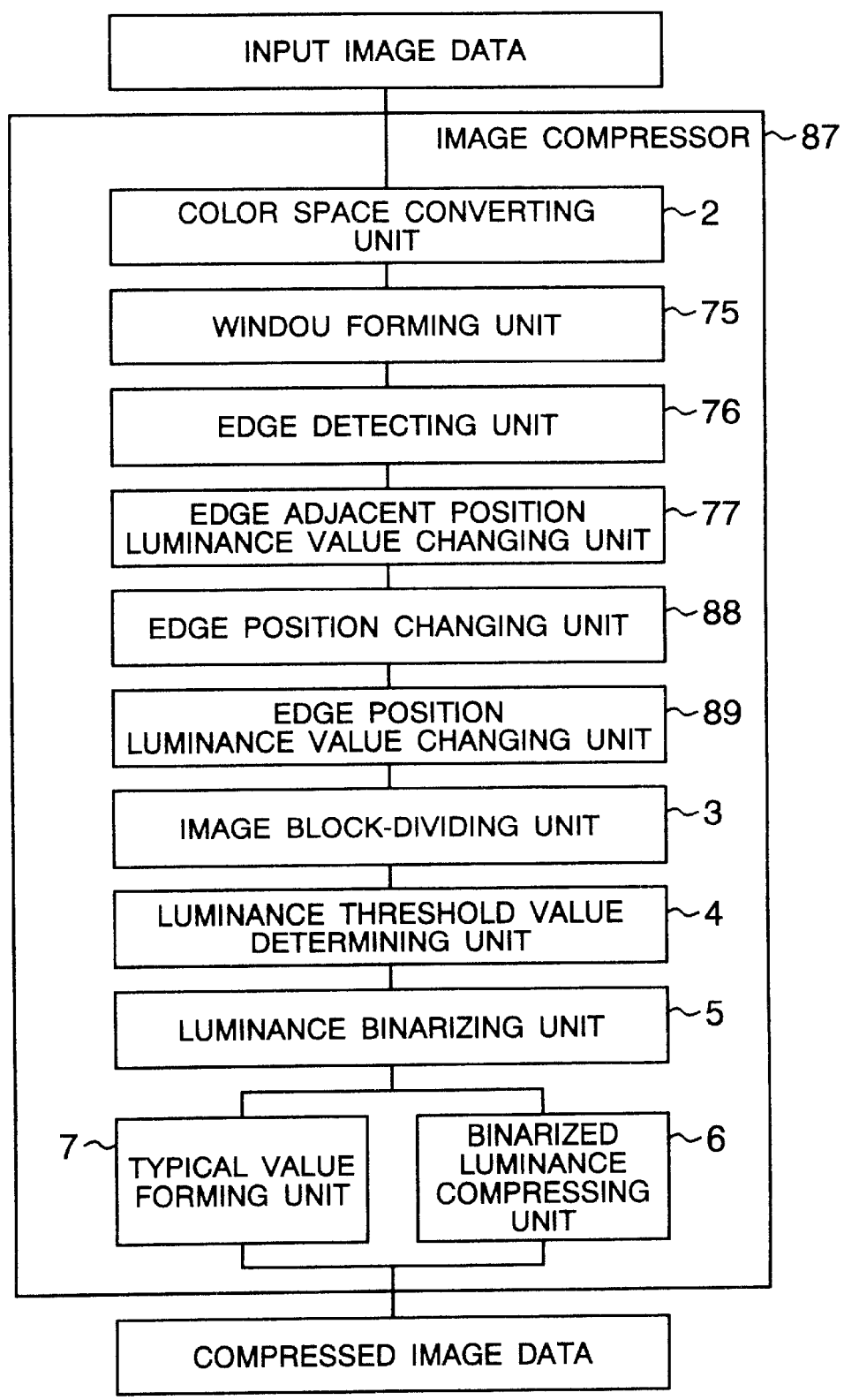
FIG. 20 is a block diagram of an image compressor according to a sixth embodiment of the present invention.

FIG. 20 is a block diagram of an image compressor according to a sixth embodiment of the present invention. In FIG. 20, a color space converting unit 2, an image block-dividing unit 3, a luminance threshold value determining unit 4, a luminance binarizing unit 5, a binarized luminance compressing unit 6, a typical value forming unit 7, a window forming unit 75, an edge detecting unit 76, and an edge adjacent position luminance value changing unit 77 are similar to the corresponding ones shown in FIG. 1. Thus, the further description thereof will be omitted. Reference numeral 87 denotes the image compressor, 88 an edge position changing unit, and 89 an edge position luminance changing unit.

Figure 21:
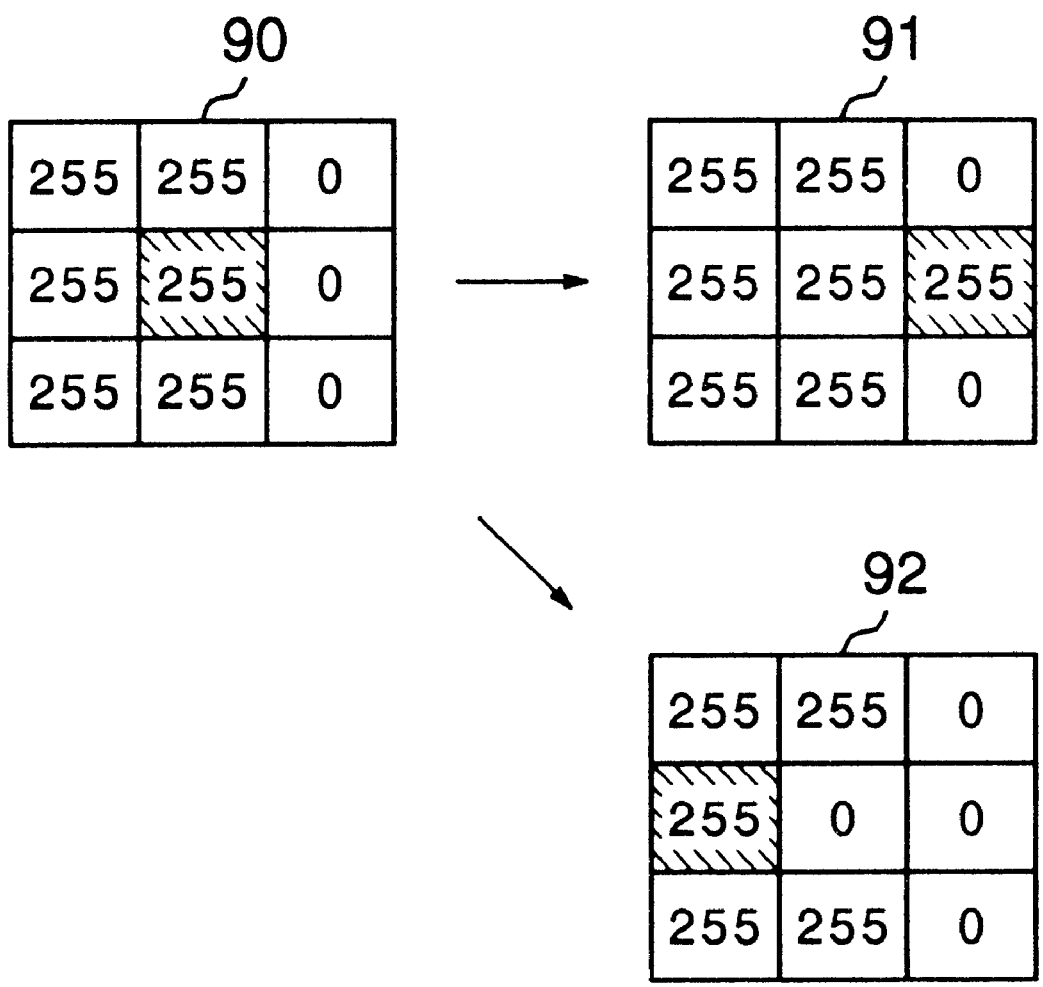
FIG. 21 is a data diagram representing an edge position change and an edge position luminance value change.

The functions and operation of the image compressor of this embodiment will be described next with reference to FIGS. 3, 5A, 5B, 17, 18A–18E and 21. FIG. 21 is a data diagram illustrating the edge position change and the edge position luminance value change.

The window forming unit 75 shown in FIG. 20 forms a window 79 of 3×3 pixels for a luminance plane as shown in FIG. 17. Reference numeral 78 denotes the luminance plane image. The window 79 moves the image every one pixel from left to right and then from up to down. The edge detecting unit 76 calculates an edge quantity for the window 79 formed by the window forming unit 75 using the above-mentioned expression (7) and the coefficients of an edge detection coefficient matrix 80. The edge detection coefficient matrix 80 has four kinds of coefficients. The edge detecting unit 76 calculates the respective edge quantities, and determines the edge quantity and direction based on the maximum edge quantity. When the edge quantity using a downward edge detection coefficient matrix 81 shown in FIG. 18B is maximum, the downward edge is determined. When the edge quantity using a rightward edge detection coefficient matrix 82 shown in FIG. 18C is maximum, the rightward edge is determined. When the edge quantity using an upward edge detection coefficient matrix 83 shown in FIG. 18D is maximum, the upward edge is determined. When the edge quantity using a leftward edge detection coefficient matrix 84 of FIG. 18E is maximum, the leftward edge is determined. The respective edge determining positions should be at a4 of the window. The edge direction and quantities thus obtained are used so that when the edge quantity is larger than the threshold of "200", the position a4 is used as the edge position. In this case, the edge adjacent position luminance value changing unit 77 changes the luminance at the adjacent position. In the case of the downward edge, the luminance at the position b3 is replaced with that at the position a7. In the case of the rightward edge, the luminance at the position b1 is replaced with that at the position a5. In the case of the upward edge, the luminance at the position b2 is replaced with that at the position a1. In the case of the leftward edge, the luminance at the position b0 is replaced with that at the position a3. The just-mentioned operation is similar to that of the fifth embodiment.

Then, the edge position changing unit 88 changes an edge position in accordance with the edge direction determined by the edge detecting unit 76 to thicken/thin the image. When the image is thickened, the edged position a4 of the window 79 is moved to a1 in the case of the downward edge;

to a3 in the case of the rightward edge; to a7 in the case of the upward edge; and to a5 in the case of the leftward edge. When the image is thinned, the edge position a4 of the window 79 is moved to a7 in the case of the downward edge; to a5 in the case of the rightward edge; to a1 in the case of the upward edge; and to a3 in the case of the leftward edge. When the image is thinned, the luminance at the edge position changed by the edge position luminance changing unit 89 is replaced with that at the position a4 of the window whereas when the image is thickened, the luminance at the position a4 is replaced with that at the position a7 in the case of the downward edge; with that at the position a5 in the case of the rightward edge; with that at the position a1 in the case of the upward edge; and with that at the position a3 in the case of the leftward edge. A manner in which the edge position and its luminance are changed is illustrated in FIG. 21.

In FIG. 21, reference numeral 90 denotes a luminance window which is processed by the window forming unit 75, the edge detecting unit 76 and the edge adjacent position luminance changing unit 77. A hatched block denotes an edge position having a rightward edge. Thinned and thickened images are denoted by reference numerals 91 and 92, respectively, which show the luminance window processed by the edge position changing unit 88 and the edge position luminance value changing unit 89. The operation of the image block-dividing unit 3 and the other subsequent elements are similar to those of the corresponding ones of the first embodiment. Thus, the further description thereof will be omitted except for the operation of the typical value forming unit 7.

The typical value forming unit 7 shown in FIG. 16 forms two typical values based on the "Y", "U" and "V" plane block data using the binarized luminance data obtained by the luminance binarizing unit 5. The typical value forming unit 7 calculates the average value of the pixels corresponding to the respective binarized luminance data "1" and the average value of the pixels corresponding to the respective binarized luminance data "0" to obtain the "U" higher- and lower-luminance typical values and the "V" higher- and lower-luminance typical values. The data thus obtained should be used as the block compressed data.

As described above, in the present embodiment, the edge position and the luminance at this position are changed, so that it is possible to adjust the thickening and thinning of the image edges.

(Seventh Embodiment)

Figure 22:
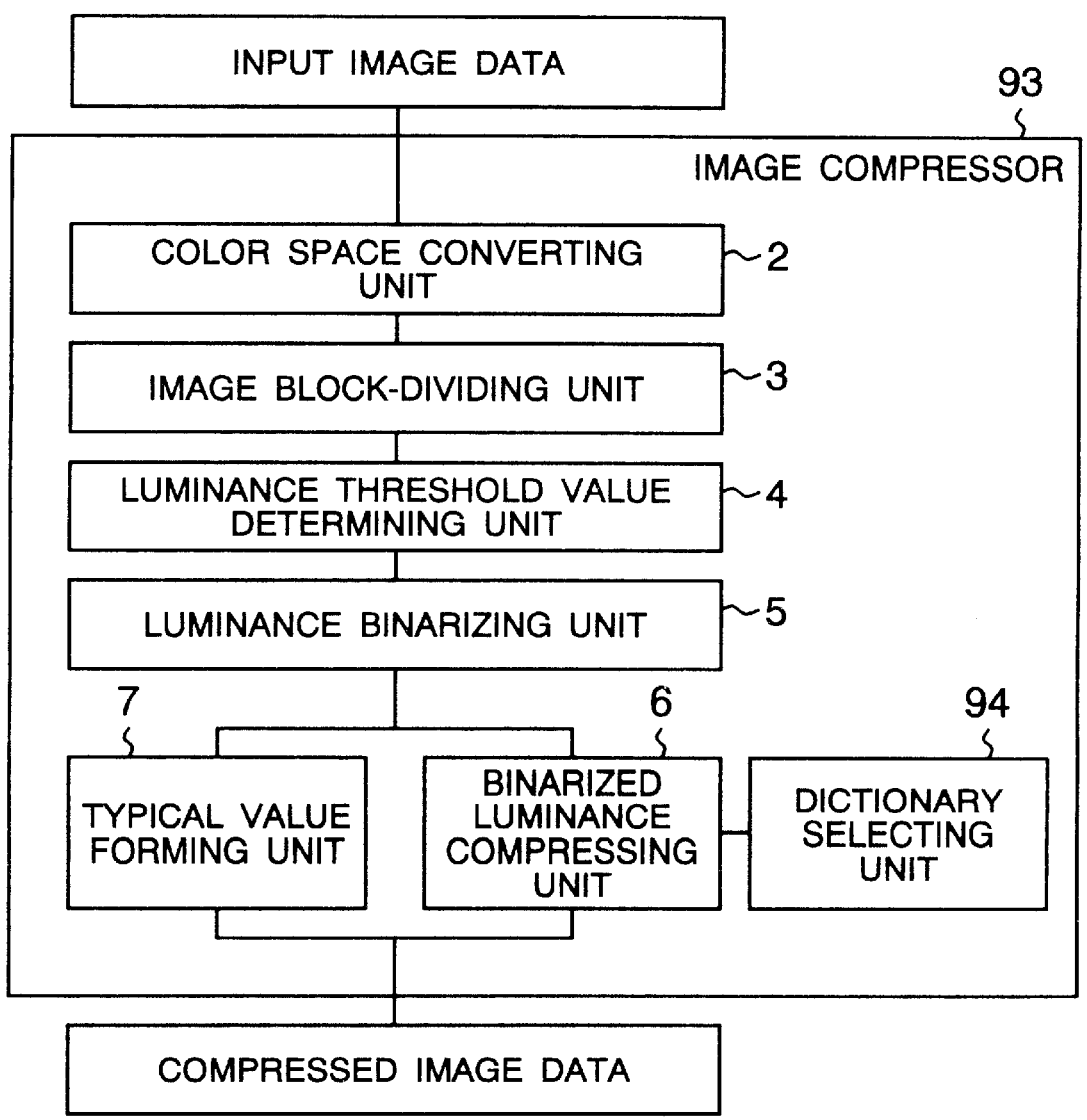
FIG. 22 is a block diagram of an image compressor according to a seventh embodiment of the present invention.

FIG. 22 is a block diagram of an image compressor according to a seventh embodiment of the present invention. In FIG. 22, a color space converting unit 2, an image block-dividing unit 3, a luminance threshold value determining unit 4, a luminance binarizing unit 5, a binarized luminance compressing unit 6, and a typical value forming unit 7 are similar to the corresponding ones shown in FIG. 1. Thus, the further description thereof will be omitted. Reference numeral 93 denotes the image compressor, and 94 a dictionary selecting unit.

Figure 23:
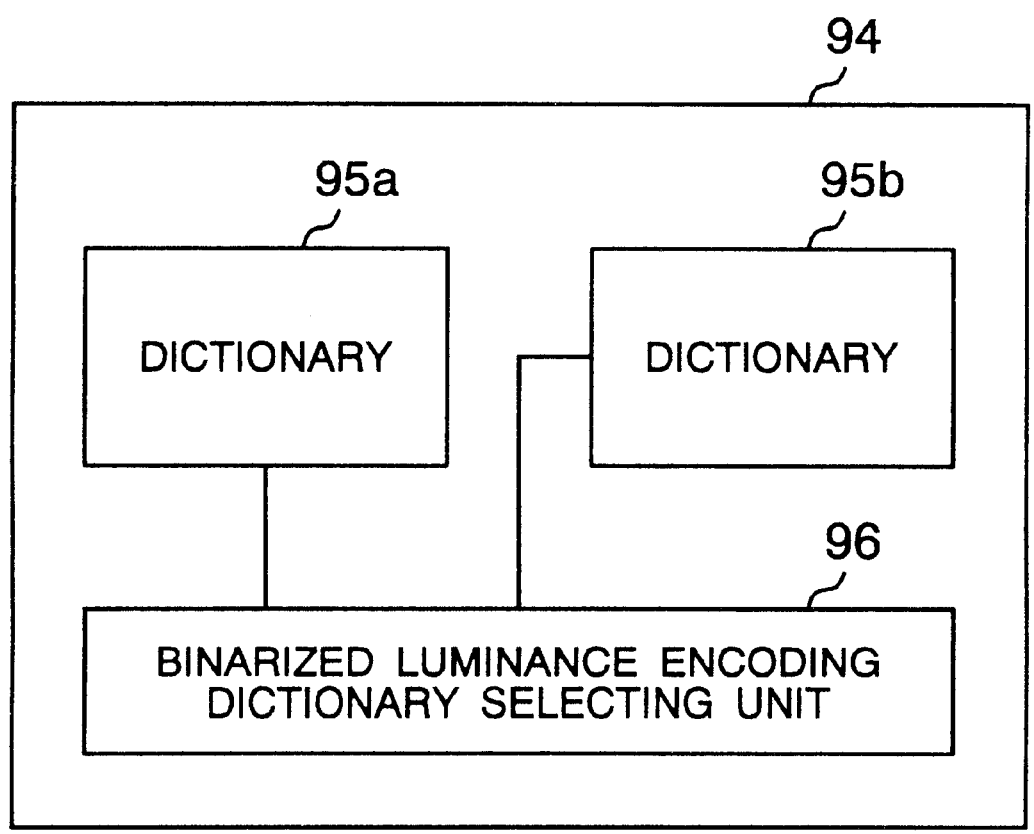
FIG. 23 is a detailed block diagram of a dictionary selecting unit.

The functions and operation of the image compressor 93 of this embodiment will be described next with reference to FIGS. 3 and 23. FIG. 23 is a detailed block diagram of the dictionary selecting unit 94. In FIG. 23, reference characters 95a and 95b denote the first and second dictionaries, and reference numeral 96 a binarized luminance encoding dictionary selecting unit. The operation of from the color space converting unit 2 to the luminance binarizing unit 5 is similar to that of the corresponding ones of the first embodiment. Thus, the further description thereof will be omitted.

The binarized luminance compressing unit 6 shown in FIG. 22 encodes the binarized luminance data using the binarized luminance data produced by the luminance binarizing unit 5 and the dictionary selected by the dictionary selecting unit 94. The first and second dictionaries 95a and 95b shown in FIG. 23 have the different typical numbers n1 and n2 (n1>n2), respectively. When the higher compression rate data is required, the second dictionary 95b is used, whereas when the lower compression rate data of the precise edge information is required, the first dictionary 95a is used.

The typical value forming unit 7 shown in FIG. 22 forms two typical values based on the "Y", "U" and "V" plane block data using the binarized luminance data obtained by the luminance binarizing unit 5. The typical values forming unit 7 calculates the average value of the pixels corresponding to the respective binarized luminance data "1" and the average value of the pixels corresponding to the respective binarized luminance data "0" to obtain the "U" higher- and lower-luminance typical values and the "V" higher- and lower-luminance typical values.

As described above, according to the present embodiment, since the compression method which selects the dictionary is used, the compression rate can be changed depending on the selected dictionary.

(Eighth Embodiment)

Figure 24:
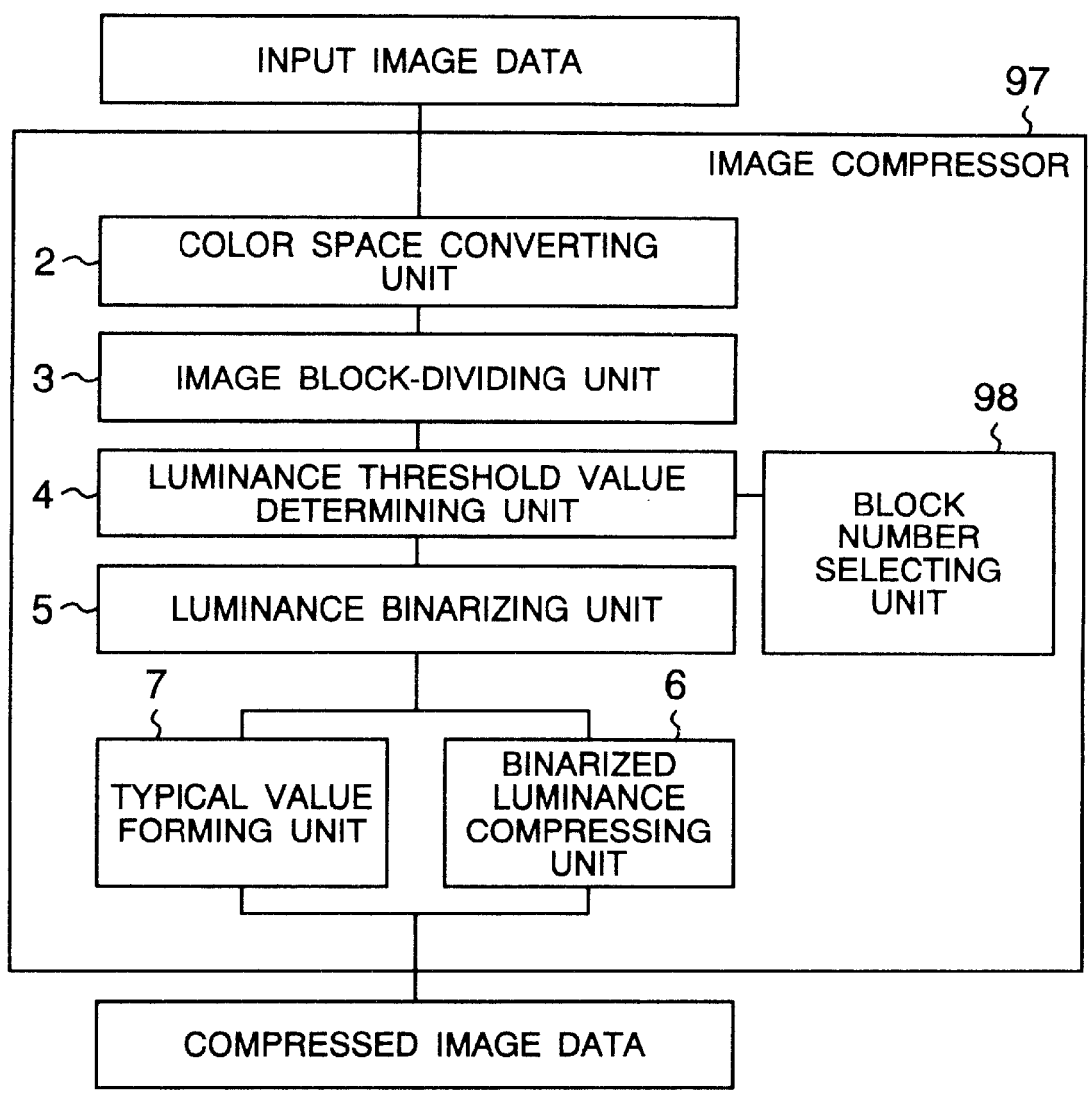
FIG. 24 is a block diagram of an image compressor according to an eighth embodiment of the present invention.

FIG. 24 is a block diagram of an image compressor according to an eighth embodiment of the present invention. In FIG. 24, a color space converting unit 2, an image block-dividing unit 3, a luminance threshold value determining unit 4, a luminance binarizing unit 5, a binarized luminance compressing unit 6, and a typical value forming unit 7 are similar to the corresponding ones shown in FIG. 1. Thus, the further description thereof will be omitted. Reference numeral 97 denotes the image compressor, and 98 a block number selecting unit.

Figure 25:
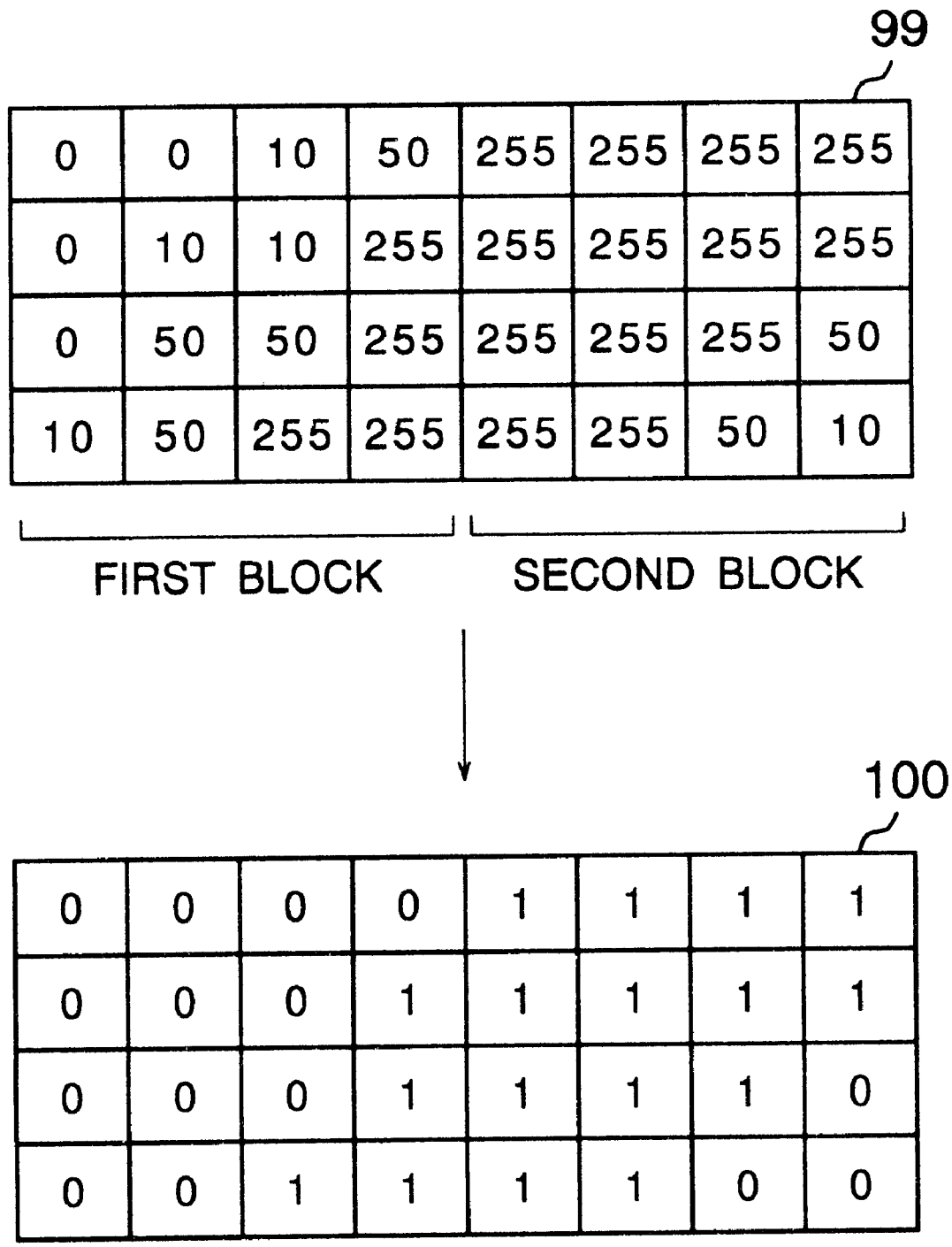
FIG. 25 is a data diagram for explaining the luminance binarization in the eighth embodiment of the present invention.
Figure 26A:
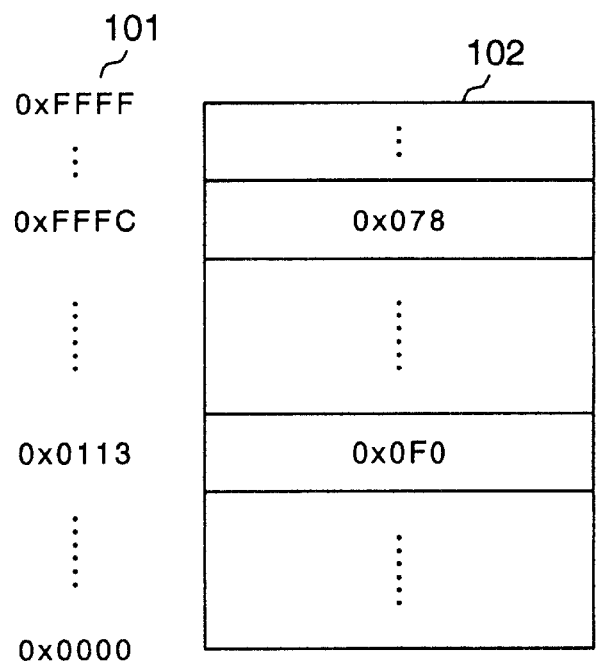
FIG. 26A is a data diagram representing a dictionary in the eighth embodiment of the present invention.
Figure 26B:
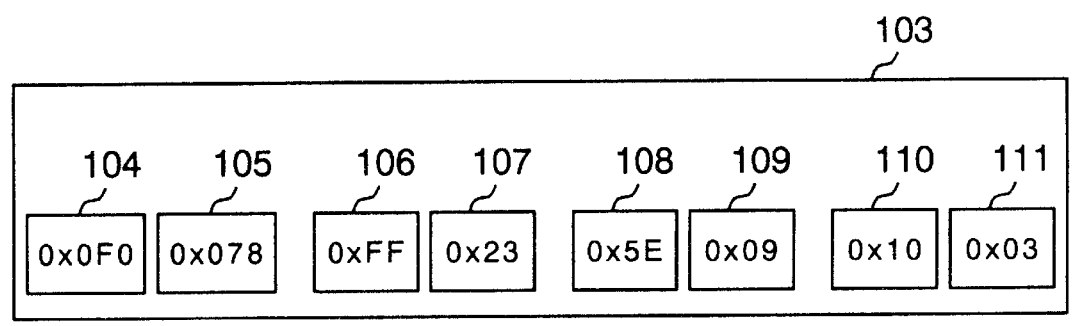
FIG. 26B is a data composition diagram illustrating the block compressed data in the eighth embodiment of the present invention.

The functions and operation of the image compressor 97 of this embodiment will be described next with reference to FIGS. 3, 5A, 5B, 25, 26A and 26B. FIG. 25 is a data diagram for explaining the binarization of the luminance in the present embodiment. FIG. 26A is a data diagram illustrating a dictionary in the present embodiment. FIG. 26B is a data composition diagram illustrating the block compressed data in the present embodiment. The operation of from the color space converting unit 2 to the image block-dividing unit 3 is similar to that of the corresponding ones of the first embodiment. Thus, the further description thereof will be omitted.

The luminance threshold value determining unit 4 shown in FIG. 24 takes the average of the luminance data in the blocks whose number is selected by the block number selecting unit 98, and sets it as a binarizing threshold value. When the data of the higher compression rate is required, the higher block number is set by the block number selecting unit 98. Whereas, when the data of the lower compression rate is required, the smaller block number is set. The luminance binarizing unit 5 outputs "1" if the luminance component of the image data in a block formed by the image block-dividing unit 3 is higher than the luminance threshold value determined by the luminance threshold value determining unit 4, and "0" if not. The binarized luminance compressing unit 6 encodes the binarized luminance data using the luminance binary data obtained by the luminance binarizing unit 5 and the dictionary having the address 16 and data 17 shown in FIG. 5. The typical value forming unit 7 forms two typical values based on the "Y", "U" and "V" plane block data for the blocks whose number is set by the block number selecting unit 98, using the binarized luminance data obtained by the luminance binarizing unit 5. The typical value forming unit 7 calculates the average value of the pixels corresponding to the respective binarized luminance data "1" and the average value of the pixels corresponding to the respective binarized luminance data "0" to obtain the "U" higher- and lower-luminance typical values and the "V" higher- and lower-luminance typical values. The data thus obtained should be the compressed block data.

A manner of the data compression will be described next with reference to FIGS. 25 and 26. Reference numeral 99 denotes the luminance data of one of the blocks into which the image plane is divided by the image block-dividing unit 3. Assume that the block number selected by the block number selecting unit 98 is "2". The luminance threshold values of the first and second blocks of the block luminance data 99 are set by the luminance threshold value determining unit 4. In this embodiment, the luminance threshold value is "145". The binarized luminance data 100 (FIG. 25) is obtained from the luminance binarizing unit 5. The block compressed data 103 (FIG. 26B) is then obtained based on the binarized luminance data 100, the dictionary (FIG. 26A) having the address 101 and data 102 of the binarized luminance compressing unit 6, and the typical value forming unit 7. The block compressed data 103 shows an example obtained when the "U" higher-luminance typical value (0×5E), the "U" lower-luminance typical value (0×09), the "V" higher-luminance typical value (0×10) and the "V" lower-luminance typical value (0×03) are obtained from the typical value forming unit 7. In FIG. 26B, reference numeral 103 denotes the block compressed data; 104 the binarized luminance compressed data of the first block; 105 the binarized luminance compressed data of the second block; 106 and 107 the higher- and lower-luminance typical value positions, respectively; 108 and 109 the "U" higher- and lower-luminance typical value positions, respectively; and 110 and 111 the "V" higher- and lower-luminance typical value positions, respectively.

As described above, according to the present embodiment, the same typical value is used for a plurality of blocks (in this embodiment, two blocks), so that the compression rate can be changed depending on the number of blocks for which the same typical value is used.

(Ninth Embodiment)

Figure 27:
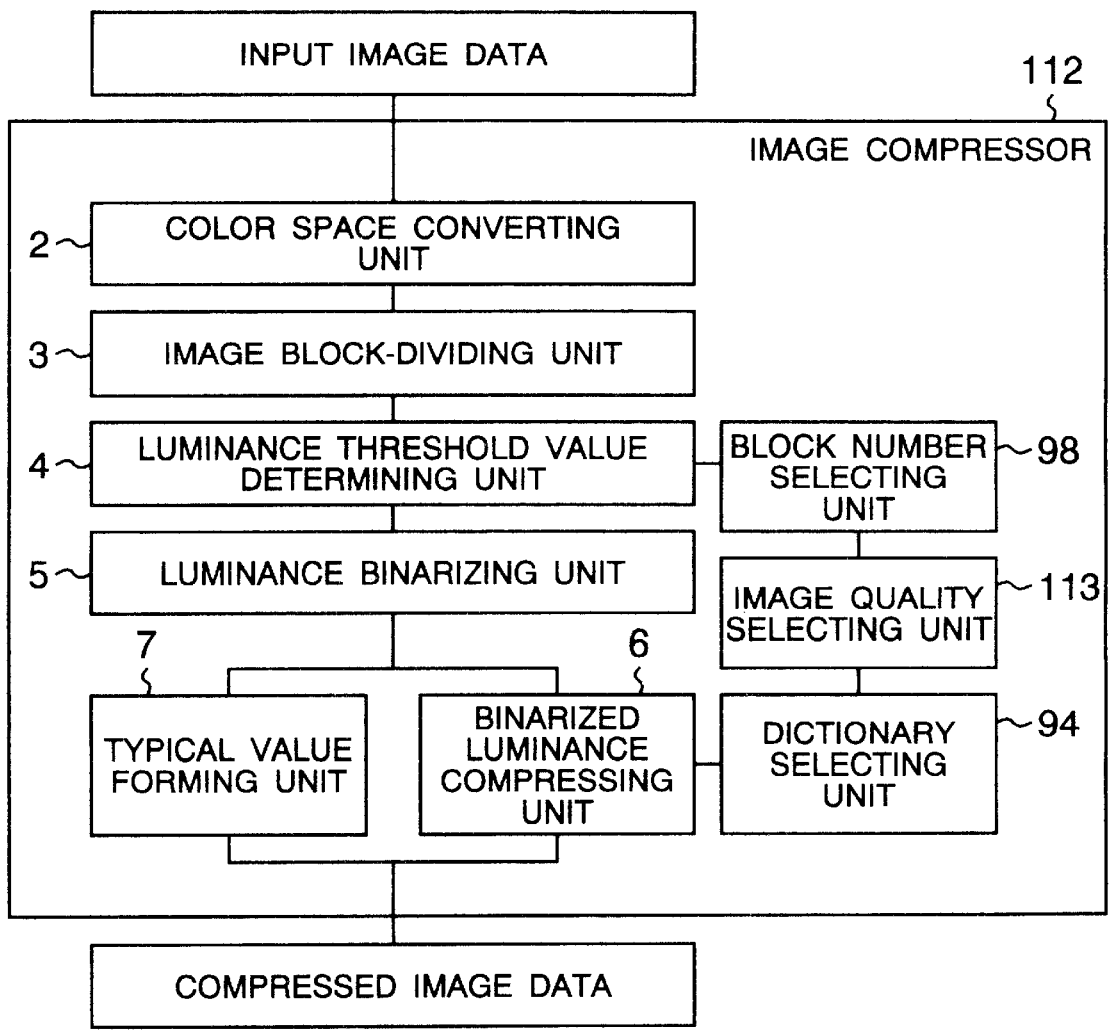
FIG. 27 is a block diagram of an image compressor according to a ninth embodiment of the present invention.

FIG. 27 is a block diagram of an image compressor according to a ninth embodiment of the present invention. In FIG. 27, a color space converting unit 2, an image block-dividing unit 3, a luminance threshold value determining unit 4, a luminance binarizing unit 5, a binarized luminance compressing unit 6, a typical value forming unit 7, a dictionary selecting unit 94, and a block number selecting unit 98 are similar to the corresponding ones shown in FIGS. 22 and 24. Thus, the further description thereof will be omitted. Reference numerals 112 denotes the image compressor, and 113 an image selecting unit.

The functions and operation of the image compressor 112 of this embodiment will be described next with reference to FIGS. 3 and 23. The operation of from the color space converting unit 2 to the image block-dividing unit 3 is similar to that of the corresponding ones of the first embodiment. Thus, the further description thereof will be omitted.

The luminance threshold value determining unit 4 shown in FIG. 27 takes the average of luminance data in the blocks whose number is selected by the block number selecting unit 98, and sets it as a threshold value for the binarization. The luminance binarizing unit 5 outputs "1" if the luminance component of the image data of a block formed by the image block-dividing unit 3 is higher than the luminance threshold value determined by the luminance threshold value determining unit 4, and "0" if not. The binarized luminance compressing unit 6 encodes the binarized luminance data using the binarized luminance data obtained by the luminance binarizing unit 5 and the dictionary selected by the dictionary selecting unit 94.

In the dictionary selecting unit 94, as shown in FIG. 23, the first dictionary 95a and second dictionary 95b are different in the typical number, and have the address 16 and data 17 shown in FIG. 5. In the first dictionary 95a, the data 17 can take a maximum value of "0×FFF". In the second dictionary 95b, the data 17 can take a maximum value of "0×3FF" The typical value forming unit 7 forms two typical values based on the "Y", "U" and "V" plane block data for blocks, whose number is set by the block number selecting unit 98, using the binarized luminance data obtained by the luminance binarizing unit 5. The typical value forming unit 7 calculates the average value of the pixels corresponding to the respective binarized luminance data "1" and the average value of the pixels corresponding to the respective binarized luminance data "0" to obtain the "U" higher- and lower-luminance typical values and the "V" higher- and lower-luminance typical values. The image quality selecting unit 113 selects between a higher image quality and a lower image quality to select a block number in the block number selecting unit 98 and the dictionary in the dictionary selecting unit 94. When the higher image quality is selected, the block number selecting unit 98 sets "1" as the block number, and the dictionary selecting unit 94 selects the first dictionary 95a of FIG. 23. When the lower image quality is selected, the block number selecting unit 98 sets "2" as the block number, so that the dictionary selecting unit 94 selects the second dictionary 95b of FIG. 23. The data thus obtained should be the block compressed data.

As described above, according to the present embodiment, the compression rate can be changed depending on the selected image quality.

(Tenth Embodiment)

Figure 28:
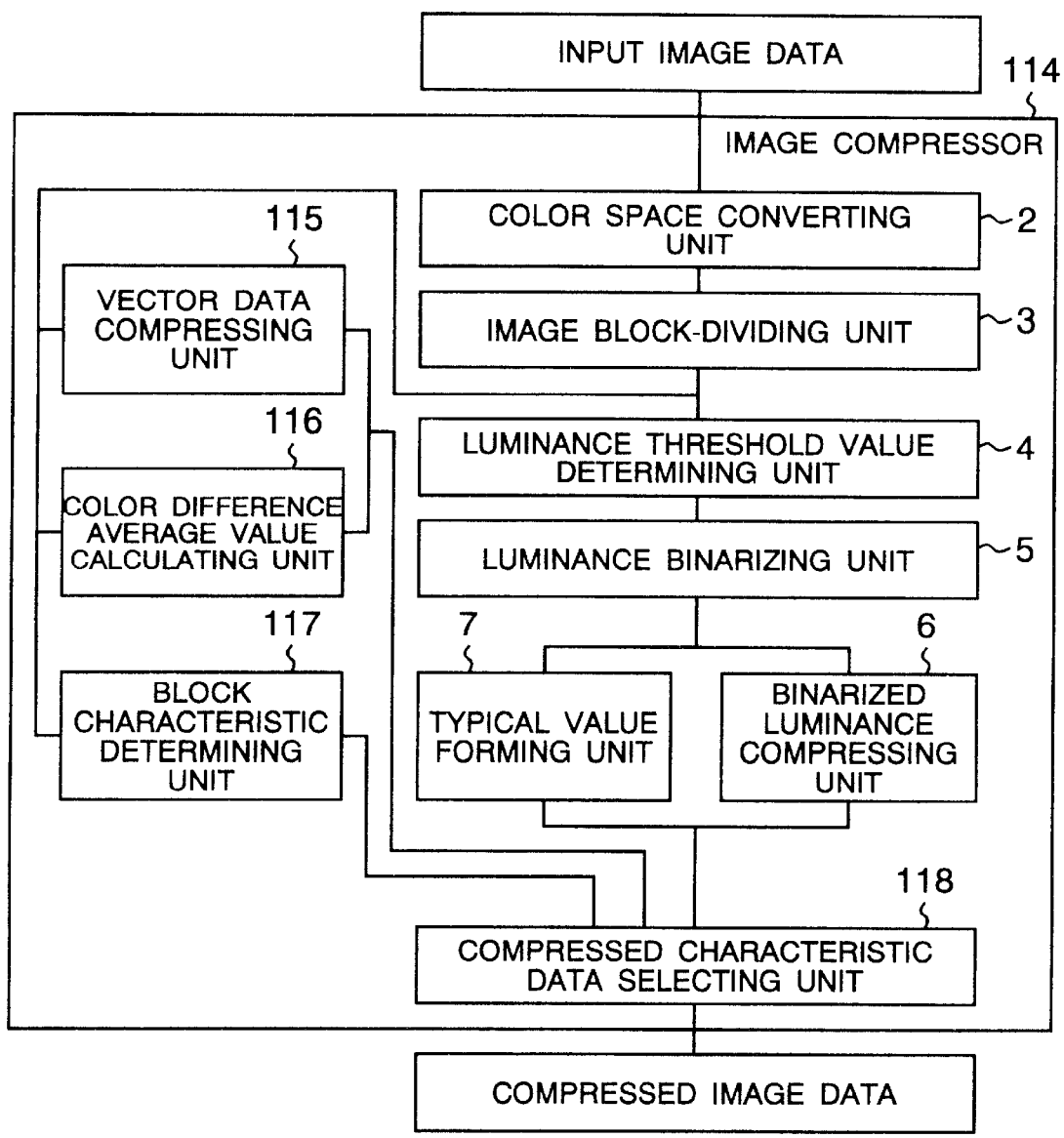
FIG. 28 is a block diagram of an image compressor according to a tenth embodiment of the present invention.

FIG. 28 is a block diagram of an image compressor according to a tenth embodiment of the present invention. In FIG. 28, a color space converting unit 2, an image block-dividing unit 3, a luminance threshold value determining unit 4, a luminance binarizing unit 5, a binarized luminance compressing unit 6, and a typical value forming unit 7 are similar to the corresponding ones of FIG. 1. Thus, the further description thereof will be omitted. Reference numeral 114 denotes the image compressor; 115 a vector data compressing unit; 116 a color difference average value calculating unit; 117 a block characteristic determining unit; and 118 a compressed characteristic data selecting unit.

Figure 29:
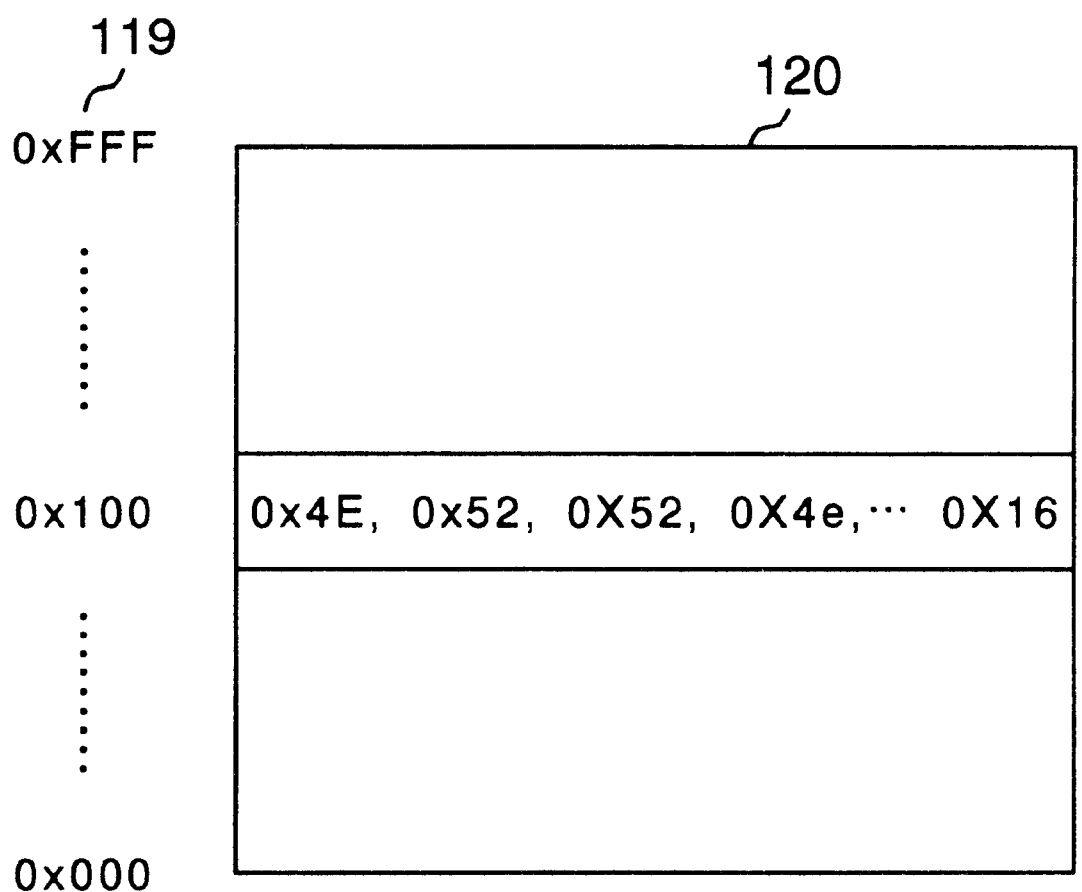
FIG. 29 is a data diagram representing a dictionary in a vector data compressing unit.
Figure 30:
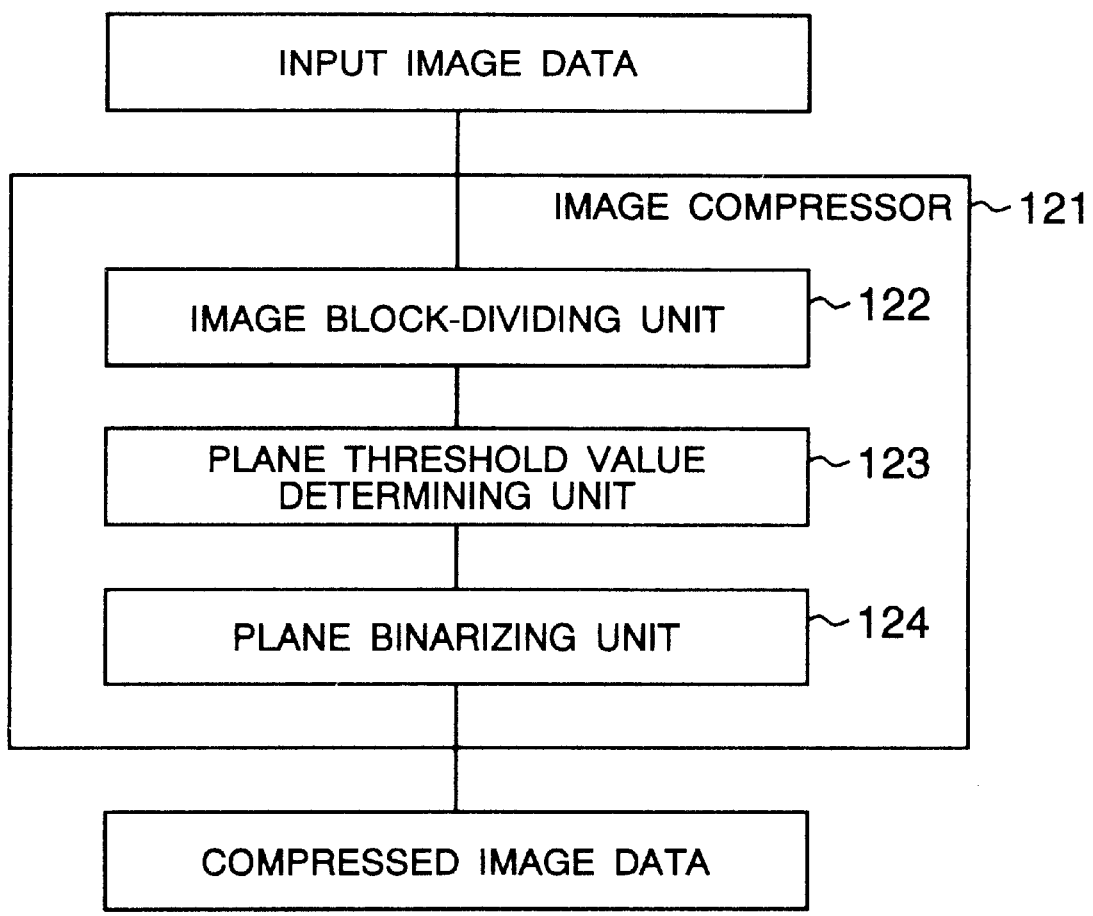
FIG. 30 is a block diagram of a conventional image compressor.
Figure 31A:
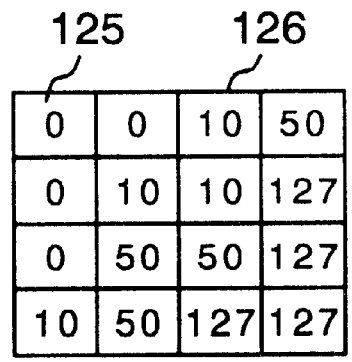
FIG. 31A is a data diagram illustrating the "R" block data.
Figure 31B:
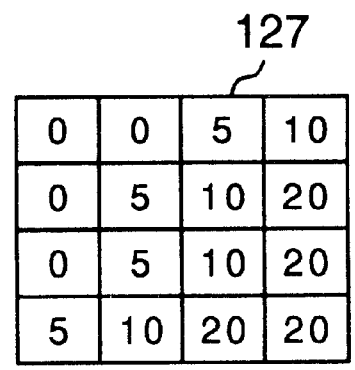
FIG. 31B is a data diagram illustrating the "G" block data.
Figure 31C:
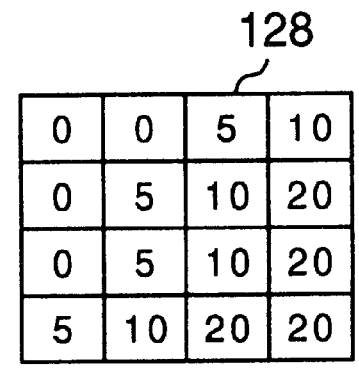
FIG. 31C is a data diagram illustrating the "B" block data.
Figure 33:
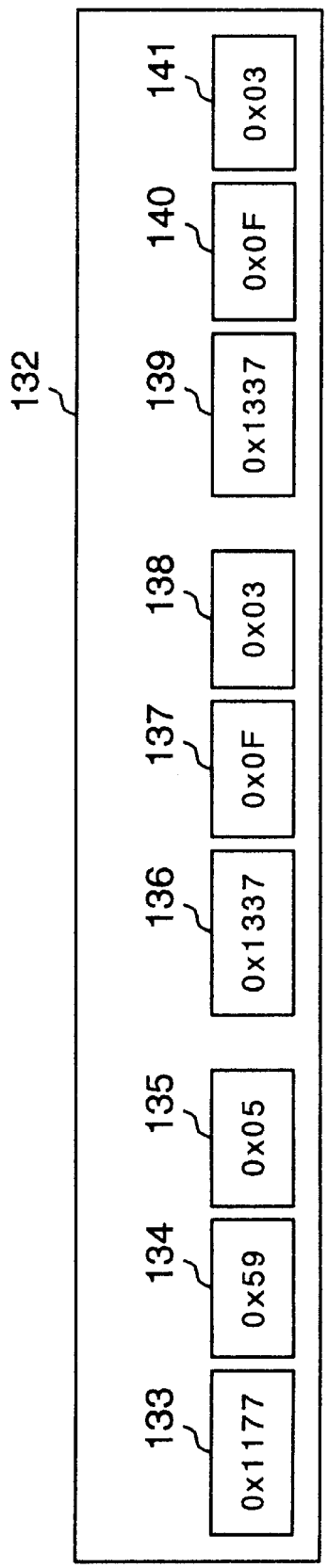
FIG. 33 is a data composition diagram illustrating the compressed data according to the block approximate encoding method in the conventional image compressor.

The functions and operation of the image compressor 114 of this embodiment will be described next with reference to FIGS. 3 and 29. FIG. 29 is a data diagram illustrating a dictionary in the vector data compressing unit 115. The operation of from the color space converting unit 2 to the typical value forming unit 7 is similar to that of the corresponding ones of the first embodiment. Thus, the further description thereof will be omitted.

The vector data compressing unit 115 shown in FIG. 28 compresses the luminance data of a block using the luminance data and a vector dictionary having a plurality of representatives shown in FIG. 29. In FIG. 29, reference numeral 119 denotes a vector dictionary address; and 120 a vector dictionary data of 8-bits for pixels of the blocks into which the image block-dividing unit 3 divides the image. The vector data compressing unit 115 calculates the sum of the absolute values each in the pixel between the block luminance data and the vector dictionary data 120 through the whole dictionary, and outputs as the luminance (Y) compressed data an address which points to the dictionary data having an minimum sum of the absolute values . The color difference average value calculating unit 116 calculates the average value of the chrominance data of a block for each of the "U" and "V", and outputs them as the color difference codes. The block characteristic determining unit 117 calculates the maximum and minimum values of the luminance data in the block. If the difference is larger than the threshold value of "127" (a preset empirical value), the block characteristic determining unit 117 determines that the data is character data to thereby outputs a corresponding signal indicative of the result of the determination. If otherwise, it determines that the data is the image data and outputs a corresponding signal. The compressed characteristic data selecting unit 118 provides as the compressed data the code outputs of the binarized luminance compressing unit 6 and the typical value forming unit 7 if the data is character one, and the code outputs of the vector data compressing unit 115 and the color difference average value calculating unit 116 if the data is image one, in accordance with the result of the determination by the block characteristic determining unit 117. Then, the compressed characteristic data selecting unit 118 adds to the compressed data one bit "1" of characteristic data (indicative of whether the determined characteristic is for a character or image) if the data i s character one, and one bit "0" of characteristic data if th e data is image one.

According to the present embodiment, the compression method of changing depending on the characteristic of the block image is performed. Thus, the appropriate compression method depending on a block image characteristic can be set.

As described above, according to the present invention, an image compressor comprises: a color space converting unit for separating an input image data into a luminance data and a chrominance data; an image block-dividing unit for block-dividing each of the luminance data and chrominance data separated by the color space converting unit into a plurality of blocks each of which includes adjacent pixels; a luminance threshold value determining unit for determining a threshold value with which a binarization of the luminance data block-divided in the image block-dividing unit is performed; a luminance binarizing unit for binarizing the block-divided luminance data using the threshold value determined by the luminance threshold value determining unit; a typical value forming unit for forming two typical values for each of the block-divided luminance and chrominance data in accordance with the luminance data binarized by the luminance binarizing unit; and a binarized luminance compressing unit for encoding the binarized luminance data using dictionaries whose number is smaller than the number of all combinations of the luminance data binarized by the luminance binarizing unit. Thus, the binarized data of the luminance and chrominance data of the image are commonized, so that it is possible to improve the compression rate. The binarized image data is encoded using the dictionaries smaller in number than the number of all combinations of the luminance binary data, so that it is possible to improve the compression rate.

What is claimed is:

1. An image compressor comprising:
a color space converting unit for separating an input image data into a luminance data and a chrominance data;
an image block-dividing unit for block-dividing each of the luminance and chrominance data separated by said color space converting unit into a plurality of blocks each of which includes adjacent pixels;
a luminance threshold value determining unit for determining a threshold value with which a binarization of the luminance data block-divided in said image block-dividing unit is performed;
a luminance binarizing unit for binarizing the block-divided luminance data using the threshold value determined by said luminance threshold value determining unit;
a typical value forming unit for forming two typical values for each of the block-divided luminance and chrominance data in accordance with the luminance data binarized by said luminance binarizing unit; and
a binarized luminance compressing unit for encoding the binarized luminance data using dictionaries whose number is smaller than the number of all combinations of the luminance data binarized by said luminance binarizing unit.

2. An image compressor comprising:
a color space converting unit for separating an input image data into a luminance data and a chrominance data;
an image block-dividing unit for block-dividing each of the luminance and chrominance data separated by said color space converting unit into a plurality of blocks each of which includes adjacent pixels;
a luminance threshold value determining unit for determining a threshold value with which a binarization of the luminance data block-divided in said image block-dividing unit is performed;
a luminance binarizing unit for binarizing the block-divided luminance data using the threshold value determined by said luminance threshold value determining unit;
a typical value forming unit for forming two typical values for each of the block-divided luminance and chrominance data in accordance with the luminance data binarized by said luminance binarizing unit;
a binarized luminance compressing unit for encoding the binarized luminance data using dictionaries whose number is smaller than the number of all combinations of the luminance data binarized by said luminance binarizing unit;
a flat compressing unit for encoding a luminance average value and a color difference average value in each block; and
a compression selecting unit for selecting as a compressed data an output of said typical value forming unit and an output of said binarized luminance compressing unit when a difference between the two typical values for the luminance data obtained by said binarized luminance compressing unit is higher than a predetermined threshold value, and an output of said flat compressing unit when the difference between the two typical values for the luminance data is lower than the threshold value.

3. An image compressor comprising:
a color space converting unit for separating an input image data into a luminance data and a chrominance data;
an image block-dividing unit for block-dividing each of the luminance and chrominance data separated by said color space converting unit into a plurality of blocks each of which includes adjacent pixels;

a luminance threshold value determining unit for determining a threshold value with which a binarization of the luminance data block-divided in said image block-dividing unit is performed;

a luminance binarizing unit for binarizing the block-divided luminance data using the threshold value determined by said luminance threshold value determining unit;

a typical value forming unit for forming two typical values for each of the block-divided luminance and chrominance data in accordance with the luminance data binarized by said luminance binarizing unit;

a binarized luminance compressing unit for encoding the binarized luminance data using dictionaries whose number is smaller than the number of all combinations of the luminance data binarized by said luminance binarizing unit; and a typical value position specifying unit for replacing a compressed data position of a higher-luminance typical value with a compressed data position of a lower-luminance typical value when the two typical values are encoded, wherein in said binarized luminance compressing unit, the replacement of the two typical values for the luminance data is one bit for encoding.

4. An image compressor comprising:

a color space converting unit for separating an input image data into a luminance data and a chrominance data;

an image block-dividing unit for block-dividing each of the luminance and chrominance data separated by said color space converting unit into a plurality of blocks each of which includes adjacent pixels;

a luminance threshold value determining unit for determining a threshold value with which a binarization of the luminance data block-divided in said image block-dividing unit is performed;

a luminance binarizing unit for binarizing the block-divided luminance data using the threshold value determined by said luminance threshold value determining unit;

a typical value forming unit for forming two typical values for each of the block-divided luminance and chrominance data in accordance with the luminance data binarized by said luminance binarizing unit;

a binarized luminance compressing unit for encoding the binarized luminance data using dictionaries whose number is smaller than the number of all combinations of the luminance data binarized by said luminance binarizing unit and which contains a bit-inversion identifying data indicative of an inverse of a binary data; and a typical value position specifying unit for replacing a compressed data position of a higher-luminance typical value with a compressed data position of a lower-luminance typical value when the bit-inversion identifying data indicates the bit-inversion, wherein said binarized luminance compressing unit represents the bit-inversion of the luminance binary data, which a dictionary data indicates, with a position of the typical values for the luminance data in a compressed data.

5. An image compressor comprising:

a color space converting unit for separating an input image data into a luminance data and a chrominance data;

a window forming unit for forming a window for the luminance data separated by said color space converting unit;

an edge detecting unit for detecting a luminance edge position and a luminance tilt direction in said window;

an edge adjacent position luminance value changing unit for changing the luminance data of a pixel adjacent to the edge position detected by said edge detecting unit, using the luminance tilt direction;

an image block-dividing unit for block-dividing the luminance data changed by said edge adjacent position luminance value changing unit and the chrominance data separated by said color space converting unit into a plurality of blocks each of which includes adjacent pixels;

a luminance threshold value determining unit for determining a threshold value with which a binarization of the luminance data block-divided in said image block-dividing unit is performed;

a luminance binarizing unit for binarizing the block-divided luminance data using the threshold value determined by said luminance threshold value determining unit;

a typical value forming unit for forming two typical values for each of the block-divided luminance and chrominance data in accordance with the luminance data binarized by said luminance binarizing unit; and a binarized luminance compressing unit for encoding the binarized luminance data using dictionaries whose number is smaller than the number of all combinations of the luminance data binarized by said luminance binarizing unit.

6. An image compressor comprising:

a color space converting unit for separating an input image data into a luminance data and a chrominance data;

a window forming unit for forming a window for the luminance data separated by said color space converting unit;

an edge detecting unit for detecting a luminance edge position and a luminance tilt direction in said window;

an edge adjacent position luminance value changing unit for changing the luminance data of a pixel adjacent to the edge position detected by said edge detecting unit, using the luminance tilt direction;

an edge position changing unit for changing the edge position detected by said edge detecting unit to a higher or lower luminance side position;

an edge position luminance value changing unit for changing the luminance data at the edge position;

an image block-dividing unit for block-dividing the luminance data changed by said edge position luminance value changing unit and the chrominance data separated by said color space converting unit into a plurality of blocks each of which includes adjacent pixels;

a luminance threshold value determining unit for determining a threshold value with which a binarization of the luminance data block-divided in said image block-dividing unit is performed;

a luminance binarizing unit for binarizing the block-divided luminance data using the threshold value determined by said luminance threshold value determining unit;

a typical value forming unit for forming two typical values for each of the block-divided luminance and chrominance data in accordance with the luminance data binarized by said luminance binarizing unit; and a binarized luminance compressing unit for encoding the binarized luminance data using dictionaries whose number is smaller than the number of all combinations of the luminance data binarized by said luminance binarizing unit.

7. An image compressor comprising:

a color space converting unit for separating an input image data into a luminance data and a chrominance data;

an image block-dividing unit for block-dividing each of the luminance and chrominance data separated by said color space converting unit into a plurality of blocks each of which includes adjacent pixels;

a luminance threshold value determining unit for determining a threshold value with which a binarization of the luminance data block-divided in said image block-dividing unit is performed;

a luminance binarizing unit for binarizing the block-divided luminance data using the threshold value determined by said luminance threshold value determining unit;

a typical value forming unit for forming two typical values for each of the block-divided luminance and chrominance data in accordance with the luminance data binarized by said luminance binarizing unit;

a dictionary selecting unit for selecting one from a plurality of dictionaries which are different in the number of combinations and which are represented by dictionaries whose number is smaller than the number of all combinations of the luminance data binarized by said luminance binarizing unit; and a binarized luminance compressing unit for encoding the binarized luminance data using the dictionary selected by said dictionary selecting unit.

8. An image compressor comprising:

a color space converting unit for separating an input image data into a luminance data and a chrominance data;

an image block-dividing unit for block-dividing each of the luminance and chrominance data separated by said color space converting unit into a plurality of blocks each of which includes adjacent pixels;

a block number selecting unit for specifying the number of blocks used for a threshold value determination of the luminance data;

a luminance threshold value determining unit for determining a threshold value with which each of the luminance data in the blocks whose number is specified by said block number selecting unit is binarized;

a luminance binarizing unit for binarizing the block-divided luminance data using the threshold value determined by said luminance threshold value determining unit;

a typical value forming unit for forming two typical values for each of the block-divided luminance and chrominance data in accordance with the luminance data binarized by said luminance binarizing unit; and a binarized luminance compressing unit for encoding the binarized luminance data using dictionaries whose number is smaller than the number of all combinations of the luminance data binarized by said luminance binarizing unit.

9. An image compressor comprising:

a color space converting unit for separating an input image data into a luminance data and a chrominance data;

an image block-dividing unit for block-dividing each of the luminance and chrominance data separated by said color space converting unit into a plurality of blocks each of which includes adjacent pixels;

a block number selecting unit for specifying the number of blocks used for a threshold value determination of the luminance data;

a luminance threshold value determining unit for determining a threshold value with which each of the luminance data in the blocks whose number is specified by said block number selecting unit is binarized;

a luminance binarizing unit for binarizing the block-divided luminance data using the threshold value determined by said luminance threshold value determining unit;

a typical value forming unit for forming two typical values for each of the block-divided luminance and chrominance data in accordance with the luminance data binarized by said luminance binarizing unit;

a dictionary selecting unit for selecting one from a plurality of dictionaries which are different in the number of combinations and which are represented by dictionaries whose number is smaller than the number of all combinations of the luminance data binarized by said luminance binarizing unit;

a binarized luminance compressing unit for encoding the binarized luminance data using the dictionary selected by said dictionary selecting unit; and an image quality selecting unit for performing the selection of the number of blocks specified by said block number selecting unit and the selection of the dictionary by said dictionary selecting unit in accordance with a selected image quality.

10. An image compressor comprising:

a color space converting unit for separating an input image data into a luminance data and a chrominance data;

an image block-dividing unit for block-dividing each of the luminance and chrominance data separated by said color space converting unit into a plurality of blocks each of which includes adjacent pixels;

a luminance threshold value determining unit for determining a threshold value with which a binarization of the luminance data block-divided in by said image block-dividing unit is performed;

a luminance binarizing unit for binarizing the block-divided luminance data using the threshold value determined by said luminance threshold value determining unit;

a typical value forming unit for forming two typical values for each of the block-divided luminance and chrominance data in accordance with the luminance data binarized by said luminance binarizing unit; and a binarized luminance compressing unit for encoding the binarized luminance data using dictionaries whose number is smaller than the number of all combinations of the luminance data binarized by said luminance binarizing unit;

a block characteristic determining unit for determining whether the block-divided luminance data is a character data or an image data;

a vector data compressing unit for encoding an dictionary address at which a difference between the block-divided luminance data and a dictionary data is minimum, using a dictionary having a plurality of multi-level luminance data the number of which is equal to the number of block pixels prepared before;

a color difference average value calculating unit for calculating a color difference average value in the block; and a compressed characteristic data selecting unit for selecting codes from said vector data compressing unit and said color difference average value calculating unit when said block characteristic determining unit determines that the luminance data is the image data, and for selecting codes form said binarized luminance compressing unit and said typical value forming unit when said block characteristic determining unit determines that the luminance data is the character data.

* * * * *